(12) United States Patent
Rankin, V et al.

(10) Patent No.: US 11,109,188 B2
(45) Date of Patent: Aug. 31, 2021

(54) REAL-TIME PROCESSING OF SPATIOTEMPORAL DATA

(71) Applicant: Disney Enterprises, Inc., Burbank, CA (US)

(72) Inventors: John Robert Rankin, V, Winter Garden, FL (US); Marcus W. Ledet, Minneola, FL (US); Jonathan Gregory Reuel, Orlando, FL (US); Samir M. Ketema, Orlando, FL (US); Steven C. Eaton, Winter Garden, FL (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/956,668

(22) Filed: Apr. 18, 2018

(65) Prior Publication Data

US 2019/0327579 A1    Oct. 24, 2019

(51) Int. Cl.
*H04W 4/029* (2018.01)
*H04W 4/021* (2018.01)
*H04L 29/08* (2006.01)
*H04W 4/80* (2018.01)
*G01C 21/14* (2006.01)

(52) U.S. Cl.
CPC .......... *H04W 4/029* (2018.02); *G01C 21/14* (2013.01); *H04L 67/12* (2013.01); *H04W 4/021* (2013.01); *H04W 4/80* (2018.02)

(58) Field of Classification Search
CPC ....... H04W 4/029; H04W 4/021; H04W 4/80; H04L 67/12; G01C 21/14; G06Q 30/0201
See application file for complete search history.

(56) References Cited

U.S. PATENT DOCUMENTS

| | | | |
|---|---|---|---|
| 6,173,209 B1* | 1/2001 | Laval | G06Q 10/02 235/382 |
| 8,676,615 B2* | 3/2014 | Callaghan | G06Q 10/02 705/5 |
| 10,009,868 B1* | 6/2018 | Reyes | H04W 64/00 |
| 2015/0188664 A1* | 7/2015 | Glosser, Jr. | H03M 13/05 714/776 |
| 2016/0131755 A1* | 5/2016 | Wijbrans | G01S 7/40 342/458 |
| 2016/0142160 A1* | 5/2016 | Walker | H04W 4/38 702/104 |
| 2016/0192149 A1* | 6/2016 | Zises | H04W 4/027 455/456.3 |

(Continued)

*Primary Examiner* — Marcos L Torres
(74) *Attorney, Agent, or Firm* — Patterson + Sheridan, LLP

(57) ABSTRACT

Systems and methods for detecting and processing spatiotemporal data are disclosed. Signals are received from user devices, where each of the signals includes an identifier of a respective user device that transmitted the signal. A first subset of the signals is determined, where each signal in the first subset was received from a first user device. A first signal in the first subset is identified to classify as a begin signal based on a configuration associated with a first physical area, and a second signal in the first subset is identified to classify as an end signal based on the configuration associated with the first physical area. An amount of time that elapsed between receiving the begin signal and receiving the end signal is determined, and an estimated spatiotemporal measure is generated based at least in part on the determined first amount of time.

20 Claims, 13 Drawing Sheets

(56) References Cited

U.S. PATENT DOCUMENTS

2017/0011423 A1\* 1/2017 Douglas ............. G06Q 30/0261
2017/0104608 A1\* 4/2017 Sergeev ............. H04L 49/3009
2017/0374197 A1\* 12/2017 Rumpf .................. H04M 3/36
2018/0046768 A1\* 2/2018 Paskett ................. G16H 40/20
2018/0247328 A1\* 8/2018 Cronin ................. G06F 16/951

\* cited by examiner

REAL-TIME PROCESSING OF SPATIOTEMPORAL DATA

BACKGROUND

Field of the Invention

The present disclosure generally relates to processing measures of time, and more specifically, to real-time detecting and processing of spatiotemporal data obtained from user devices.

Description of the Related Art

Determining real-time temporal data is important when groups of people gather in any location. For example, administrators and employees need to know the current wait time for a queue in order to determine whether additional queues should be opened, the queue should be closed, and the like. Additionally, it is frequently important to accurately anticipate crowds and waits in order to better serve customers, such as by opening additional queues before the wait time gets too long. Current systems to process wait times, however, are inefficient and prone to inaccuracy.

One existing approach to determine the wait time of a queue is to simply visually determine how long the queue is. This approach is insufficient for several reasons, including that it requires an employee or other administrator to visually observe the queue, and does not take into account various factors that influence how quickly the queue will move. Other approaches similarly require at least one employee to manually track users in the queue, either using identifying cards, writing down times, or the like. Accordingly, there is a need for a solution that provides automated real-time processing of various spatiotemporal measures, such as wait time and dwell time.

SUMMARY

Embodiments of the present disclosure provide a method. The method includes receiving a plurality of signals from a plurality of user devices, where each of the signals includes an identifier of a respective user device that transmitted the signal. The method further includes determining a first subset of the plurality of signals, where each signal in the first subset was received from a first user device. Additionally, the method includes identifying a first signal in the first subset to classify as a first begin signal based on a configuration associated with a first physical area, and identifying a second signal in the first subset to classify as a first end signal based on the configuration associated with the first physical area. Finally, the method includes determining a first amount of time that elapsed between receiving the first begin signal and receiving the first end signal, and generating a first estimated spatiotemporal measure based at least in part on the determined first amount of time.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate typical embodiments of this invention and are therefore not to be considered limiting of its scope, for the invention may admit to other equally effective embodiments.

DETAILED DESCRIPTION

Figure 1:
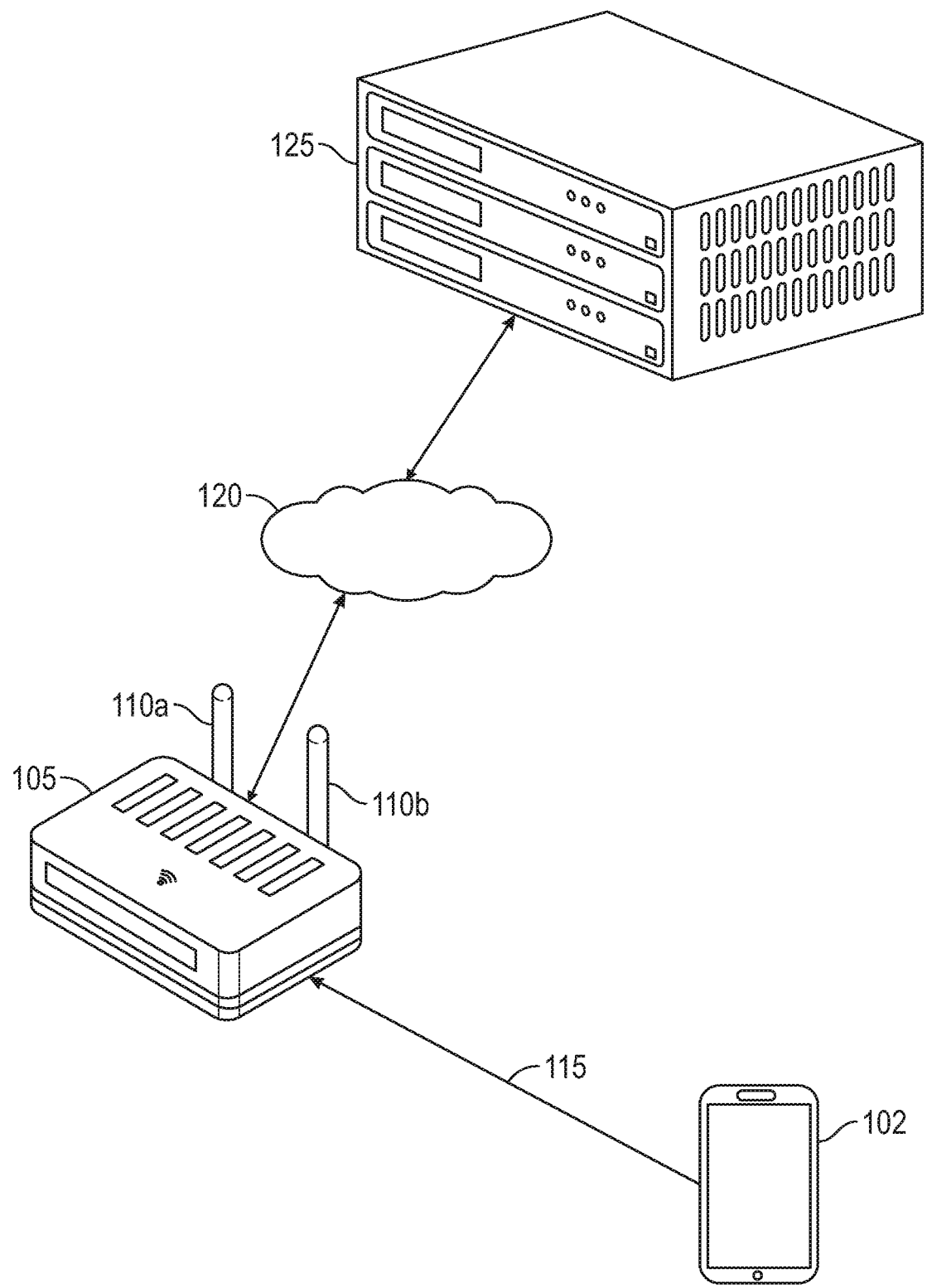
FIG. 1 illustrates a system including a user device, a signal processing device, and a computing device, according to one embodiment of the present disclosure.

Efficient design and implementation of public spaces requires an understanding of a wide variety of spatiotemporal measures associated with crowds in the space. For example, in an embodiment, how long the wait time is for a register at a store will determine whether additional registers or queues need to be included during the design and construction phase, and whether additional queues need to be opened during operation. Similarly, the area set aside for a queue, (e.g., a path delineated by ropes or other barriers) will need to be adjusted both during design and operations based on the number of people in the queue and the time it will take a person to move through the queue. Similarly, the individuals in the area will likely want to know how long the wait time will be before they choose a queue, if there are multiple options, or before they decide whether to enter a queue at all.

Similar spatiotemporal measures are desired in other related contexts. For example, in some embodiments, in addition to a wait time in a queue, an estimated spatiotemporal measure can include the amount of time required to prepare food (such as in a restaurant), or the length of time customers spend waiting for their food. Similarly, desired spatiotemporal measures can include the length of time spent waiting for a means of transportation to arrive (such as waiting for a shuttle, tram, taxi, ride share vehicle, bus, and the like), as well as the amount of time that elapses while in transit (e.g., after boarding the transport but before arriving at the destination). The spatiotemporal data can also be used to determine the popularity of various attractions at different times of day, such as at a booth at a trade show. As used herein, an attraction is anything that attracts guests, customers, or users for any reason. Attractions may be stationary (e.g., bus stops, park benches, etc.) or movable (e.g., a street performer, a person signing autographs, etc.).

Additionally, in some embodiments, the determined spatiotemporal measure includes a length of time that users remains in an area. For example, how long customers sit at a table during a meal, how long users remain seated on or near a bench or other seating area, how long they remain at a location or display within a store, and the like. In some embodiments the spatiotemporal measure includes an amount of time that users spend near a moving or movable thing, such as a roaming performer or employee, rather than in a particular geographical area. In various embodiments, how much time users spend in a larger area such as a pavilion, theme park, or region of a park or building can also be included. Similarly, the length of time users spends walking between two areas or points of interest can be determined in various embodiments. In various embodiments, the spatiotemporal data can be aggregated or otherwise combined to generate average or estimated measures. Embodiments of the present invention can generally be implemented to process and generate any spatiotemporal measures.

In addition to purely time-based measures, embodiments disclosed herein enable the physical location of individual users to be determined across time in order to determine the spatiotemporal measure. Similarly, in some embodiments, the location data can be aggregated as well. In various embodiments, historical spatiotemporal data can be used to better design and refine the physical spaces users occupy, better anticipate and handle groups of users, and improve the experience of each individual user substantially.

In various embodiments of the present disclosure, devices associated with each individual user, customer, visitor, guest, and the like are utilized to achieve these goals. In some embodiments, these devices can transmit unique identifier signals that are detected by any number of signal processing devices, readers, or sensors. In other embodiments, the user devices may additionally or alternatively receive signals transmitted by beacons.

FIG. 1 illustrates a user device 102, according to one embodiment of the present disclosure. In various embodiments the user device 102 can be implemented as any device capable of wirelessly communicating a unique identification, such as a mobile telephone, a pendant, card, wristband, or other physical device equipped with radio frequency identification (RFID) or any wireless communication technology that enables communication over a suitable distance in a particular environment. In some embodiments, the user device 102 can be a device that does not communicate using wireless signals, but that contains some other identifier such as a barcode or other machine-readable representation of data that can be used to uniquely identify the user device 102. In some embodiments, the user device 102 is wearable and nonintrusive, such that the user's experience is not slowed or disturbed by carrying or using the device 102.

Although not illustrated, in an embodiment, the user device 102 includes a wireless communications interface which can communicate using any wireless protocol. In some embodiments, the user device 102 can transmit different signals, for example, in different frequencies, using different antennas, and the like. In an embodiment, the communications interface includes a short-range communications device and a long-range communications device. In some embodiments, the user device 102 may also include or be integrated with a watch, computing device, sensors for detecting biometric data including heart rate, and the like. The user device 102 can transmit and/or receive wireless communication signals using this communications interface.

In various embodiments, user device 102 transmits one or more signals continuously, periodically, at arbitrary intervals, or on-demand. In an embodiment, user device 102 transmits a "ping" signal every second, every five seconds, every thirty seconds, every minute, or at other periodic intervals to satisfy the communication needs and battery life needs of a particular application. In some embodiments, the ping includes identifier information that can be used to uniquely identify the user device 102, or identify a group to which the user device 102 belongs. In this way, each particular user device 102 can be identified at disparate physical locations, and the corresponding time at which the particular user device 102 was at the location can be determined.

In some embodiments, user device 102 emits signals when it is activated or switched into a first mode, and can be deactivated or switched into a second mode to conserve power. For example, in an embodiment, user device 102 may have a switch, button, or other input device that a user can use to activate or deactivate the transmission of pings. In one embodiment, user device 102 can be activated and deactivated remotely. For example, in such an embodiment the user device 102 can periodically scan for and receive signals. In such an embodiment, the user device 102 can activate, or begin transmitting pings, when the signal is detected, and deactivate, or cease transmitting pings, when the signal is not detected (e.g., because the user device has moved away from the transmitter). In this way, battery power may be conserved when the user is not near an area where the user device 102 is useful.

In addition to the user device 102, FIG. 1 further includes a signal processing device 105, and a computing device 125, according to one embodiment of the present disclosure. As illustrated, user device 102 transmits a signal that is detected by the signal processing device 105. In various embodiments, the signal processing device 105 may be referred to as a reader, a detector, a sensor, and the like. In the illustrated embodiment, as indicated by the directionality of arrow 215, the user device 102 is configured to transmit signals, but is not configured to receive wireless communications. In some embodiments, however, user device 102 can additionally or alternatively receive signals from other transmitters, whether in normal use or in specific instances. For example "normal use" of user device 102 can include transmitting an identifier continuously or frequently (e.g., every second, every five seconds, every minute, and the like), while periodic or infrequent use can include receiving transmissions for remotely updating the device, receiving communications, and the like. Alternatively, in some embodiments, the normal use of user device 102 includes receiving continuous or frequent signals.

The signal processing device 105 includes antennas 210a and 210b. Although the illustrated embodiment includes two antennas 210a-b, there may of course be any number of antennas 210a-b in various embodiments, including a single one. Additionally, in some embodiments, one or both of external antennas 210a-b may be replaced by some other method of receiving wireless signals. In embodiments, multiple signal processing devices 105 can be placed around an area in order to detect pings from user devices 102. Based on the configuration and location of each signal processing device 105, the location of the detected user devices 102 can be determined. For example, if a particular user device 102 is detected by a first signal processing device 105, it can be determined (for example, by the computing device 125) that the particular user device 102 is located at or near the location of the first signal processing device 105. Further, in some embodiments, based on the detected signal strength, it can be determined that the user device 102 is within a specific range or distance from the signal processing device 105. Similarly, based on the timestamps of the received pings, the movement of the user device 102 can be determined across time and space.

In some embodiments, the location of the user device 102 is determined based on detections of the user device 102 by multiple signal processing devices 105. For example, two or more signal processing devices 105 may detect a particular ping from the user device 102 and transmit this identifier information to the computing device 125. In some embodiments, the signal processing device 105 may also include a timestamp, signal strength, and the like. In one embodiment, the computing device 125 can determine the location of the user device 102 by triangulation using the known locations of each signal processing device 105 as well as the detected signal strength at each signal processing device 105 and/or the timestamp at which the ping was detected by each signal processing device 105. In some embodiments, the computing device 125 can determine the location of the user device 102 using detections from two signal processing devices 105 (as opposed to three or more) because it can generally be assumed that the user device 102 is located on or near the ground (i.e., a third signal processing device 105 is not required, because locating the user within a two-dimensional plane is sufficient and the user device 102 need not be located in three-dimensional space for the particular application).

In the illustrated embodiment, once signal processing device 105 receives a ping from user device 102, the information is forwarded to a computing device 125, such as one or more servers, or other computer(s). In some embodiments, however, signal processing device 105 performs all or some of the functionality discussed in relation to computing device 125. In the illustrated embodiment, the signal processing device 105 communicates with computing device 125 via a network 220, which may be wired, wireless, or any combination thereof.

In various embodiments, each signal processing device 105 can be configured by an administrator or manager. For example, in one configuration, the signal processing device 105 will register signals from user devices 102 that are in close proximity, such as touching or within several inches. This configuration may be useful for embodiments that require some affirmative action by the user in order to be detected. For example, in some embodiments, the user device 102 is used to identify the user when purchasing goods or services, and the user device 102 must be touched or tapped to the signal processing device 105, or placed in close proximity. Similarly, in some embodiments, the user device 102 is used to gain access to restricted areas, which may require the user to place the user device 102 in close proximity to a signal processing device 105 for a period of time.

In another configuration, the signal processing device 105 can register signals from user devices 102 that are further away. In an embodiment, the range at which each signal processing device 105 detects and registers user devices 102 is controlled by setting the threshold signal strength at which a user device 102 is considered "detected." As a user device 102 moves further from a signal processing device 105, the detected signal strength generally declines. Thus, in an embodiment, an administrator can control at what distance a user device 102 is detected (i.e., the distance at which received signals are registered as detections of the user device 102) by setting a minimum signal strength to register a valid detection. For example, a relatively low threshold may be used to detect user devices 102 from several hundred feet away, while a relatively higher threshold may be used to recognize user devices 102 that are within a few feet or a few dozen feet.

Any threshold signal strength can be used to determine the detection range. In an embodiment, the threshold is set based on a signal strength (e.g., "greater than −50 dBm"). Additionally, because the detected signal strength at a given distance may vary based on the specific environment and obstacles around the signal processing device 105, in an embodiment, the threshold can be first set to an initial value, and then the value can be fine-tuned for the particular environment during operations, such as by incrementally increasing or decreasing the threshold value until the desired detection range is achieved.

In some embodiments, each signal processing device 105 can be further configured to notify computing device 125 each time a signal is detected, and computing device 125 can determine whether the detected signal exceeds the predefined threshold. In other embodiments, signal processing device 105 determines whether the detected signal exceeds the threshold value, and only provides signals that exceed the threshold value to computing device 125. In an embodiment, the signal processing device 105 can be configured to apply one or more filters prior to communicating with computing device 125 about the received signals. For example, in an embodiment, signal processing device 105 can be configured to transmit indications to computing device 125 about the first signal received from a user device 102, the last signal received, the strongest signal received, and the like, rather than about all received signals. In other embodiments, signal processing device 105 may transmit all sufficiently strong detections to the computing device 125, and computing device 125 can apply similar filters to determine which signal(s) are relevant.

Figure 2:
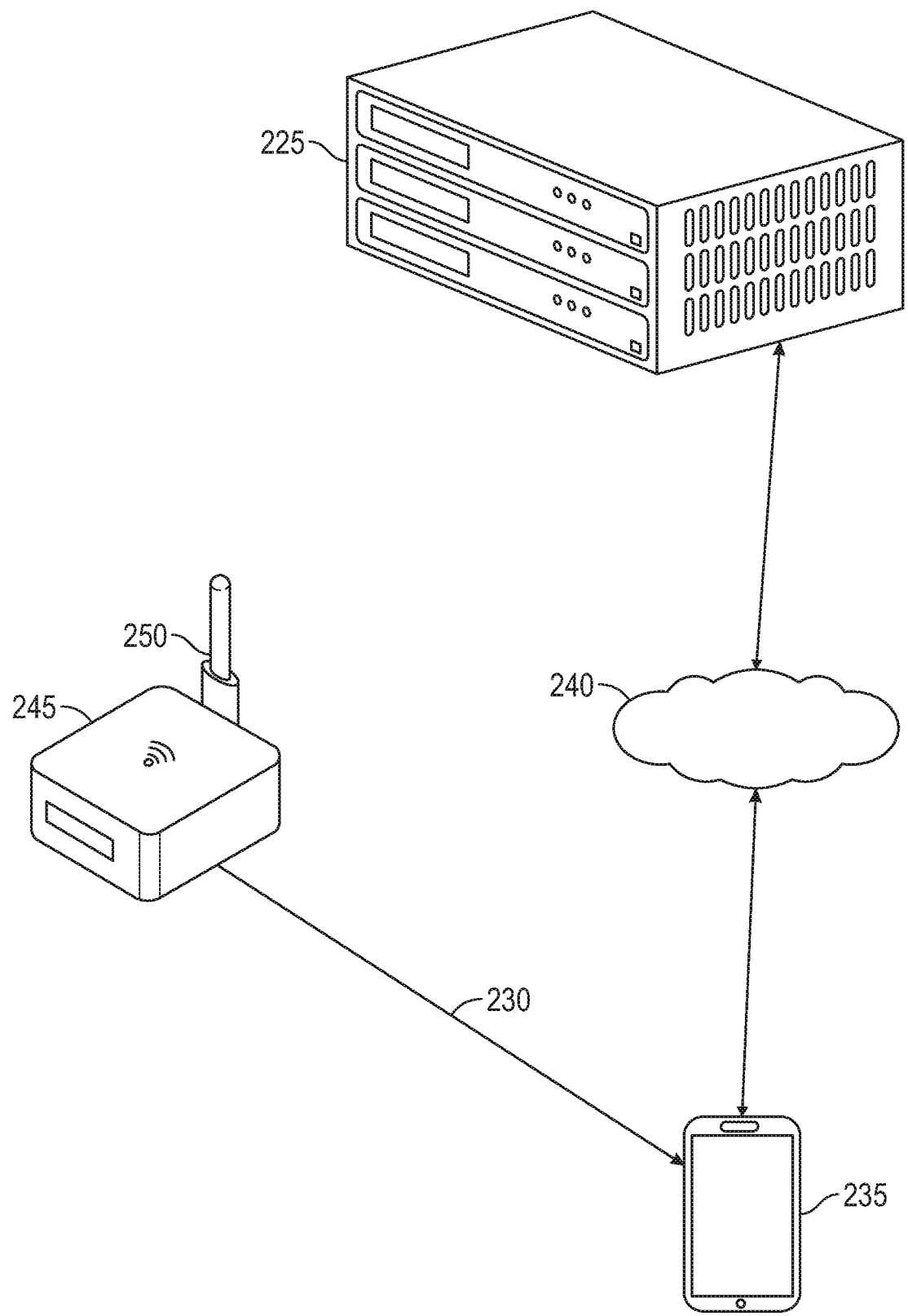
FIG. 2 illustrates a system including a user device, a signal processing device, and a computing device, according to one embodiment of the present disclosure.

FIG. 2 illustrates a system including a user device 235, a beacon 245, and a computing device 225, according to one embodiment of the present disclosure. In the illustrated embodiment, beacon 245 transmits signals, such as pings discussed above in reference to user device 235, using one or more antenna 250. As illustrated by the arrow 230, these pings can be detected by a user device 235, such as a smartphone or other mobile device. Similarly, as illustrated, the user device 235 can communicate with computing device 225, via a network 240, which may be wired, wireless, or any combination thereof. In the illustrated embodiment, a number of beacons 245 can be placed in various locations, and can transmit an identifying signal, similarly to user devices 102 above. For example, a beacon 245 can be placed at a specific location, and transmit a signal that identifies the location by name, by coordinates, or by some other location identifier.

Upon receiving the identifying signal, each user device 235 can determine its location based on the stated location in the signal. For example, in some embodiments, the user device 235 may be unable to determine its own location (e.g., via GPS) because it is either not configured to do so, or is currently in a location that precludes such a determination (e.g., inside of a building or tunnel). In such an embodiment, the location of the user device 235 can be determined (by the user device 235 or by the computing device 225) based on the particular beacon(s) 245 that are detected by the user device 235. In embodiments, this information can be transmitted to Computing Device 225 for processing, or may be processed and used locally on user device 235. In one embodiment, this information can be used by computing device 225 in much the same way as the spatiotemporal data provided by user devices 102 and signal processing device 105, to locate the user device at a particular time and place. In another embodiment, the user device 235 can use the data locally in various ways. For example, user device 235 may provide a prompt to the user to provide feedback about the identified location. Similarly, in an embodiment user device 235 can use the identified location to provide location-specific content, such as multimedia or text, which enhances the user's experience of the associated place.

In some embodiments, beacons 245 and signal processing devices 105 are used at the same time in order to obtain the spatiotemporal data from user devices 102 and 235. In some embodiments, a single user device can perform both receiving signals from beacons 245 and transmitting signals to signal processing devices 105. In embodiments disclosed herein, signal processing devices 105 and beacons 245 may be used interchangeably to receive signals from user devices 102 and to transmit signals to user devices 102, respectively. That is, in some embodiments, instead of utilizing a signal processing device 105 to receive signals from user devices 102, a beacon 245 can be installed to transmit signals to user devices 102, which are then forwarded to computing device 245 and processed in much the same way as signals received by signal processing device 105. Similarly, in some embodiments, a single device may act as both a signal processing device 105 and a beacon 245 and be configured to both transmit and receive signals.

Figure 3:
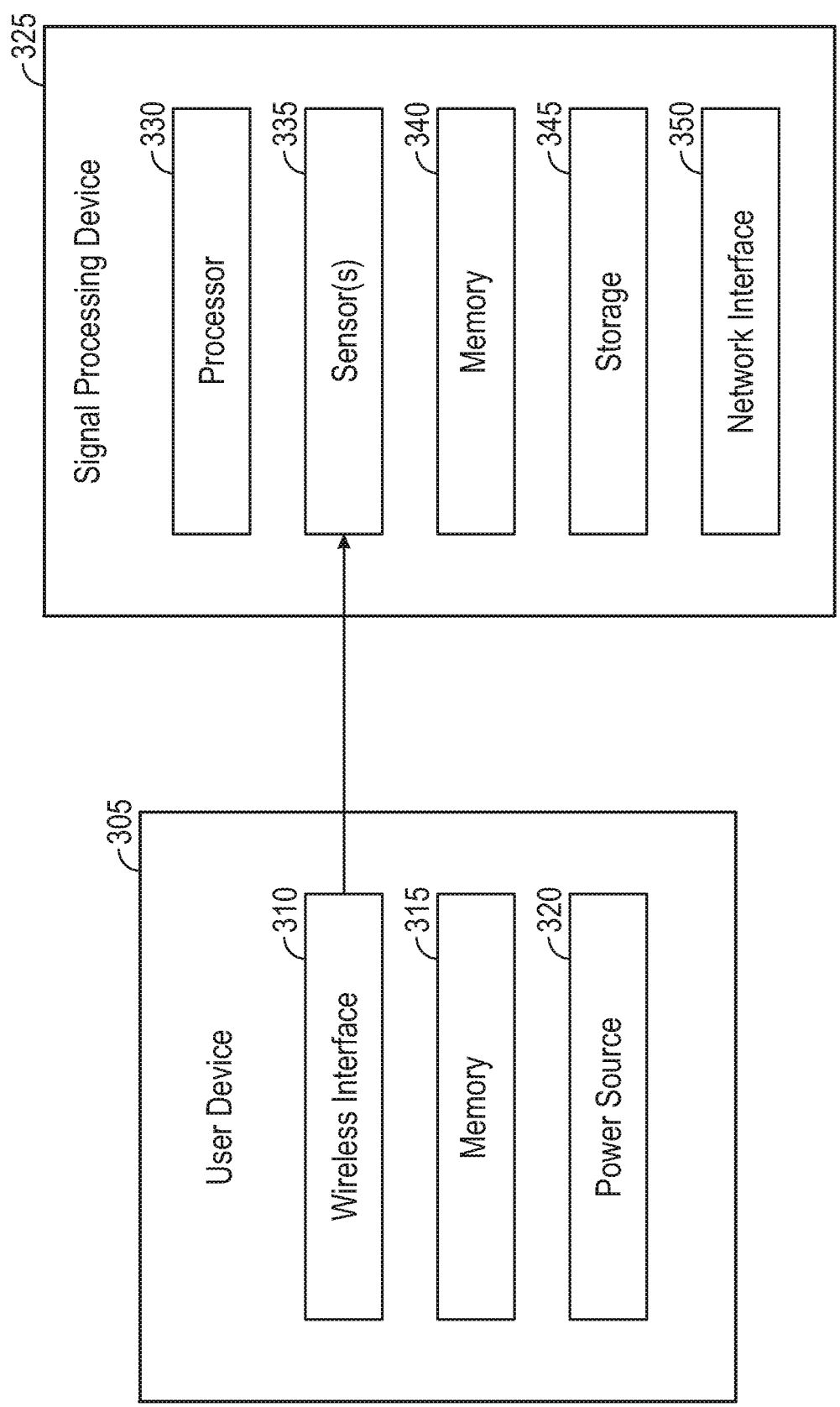
FIG. 3 is a block diagram of a user device and a signal processing device, according to one embodiment to the present disclosure.

FIG. 3 is a block diagram of a user device 305 and a signal processing device 325, according to one embodiment to the present disclosure. The user device 305 includes a wireless interface 310, memory 315, and a power source 320. In some embodiments, a user device 305 may in fact have multiple wireless interfaces 310, such as a short-range interface and a long-range interface. In one embodiment, each wireless interface 310 can communicate using a different frequency, a different protocol, a different antenna, or any other differences. For example, in an embodiment, each user device 305 is configured with a passive (unpowered) high frequency (HF) radio frequency identification (RFID) chip and coupling device (e.g., antenna) as one wireless interface 310, and an active (powered) 2.4 GHz radio as a second wireless interface 310. Similarly each wireless interface 310 can be configured to transmit data but not receive it, to receive data but not transmit it, or be configured to both transmit and receive data.

Memory 315 is used to store any programming instructions or data required to operate user device 305. For example, memory 315 may store the unique identifier associated with the user device 305. Memory 315 may be ROM, PROM, EPROM, EEPROM, flash memory, solid-state storage, and the like. In some embodiments, user device 305 may also include a processor (not illustrated) and other hardware components to achieve the functionality described herein. However, although the illustrated embodiment includes a discrete memory 315, in some embodiments, the functionality described herein may be provided using one or more integrated components on a microchip or integrated circuit, without the need for a separate and discrete memory or processor hardware.

Although the illustrated embodiment includes a power source 320, in some embodiments, user device 305 relies on passive communications and does not require a power source 320. For example, in an embodiment, user device 305 utilizes passive RFID, where power is received wirelessly from the reader device, such as signal processing device 105, rather than provided on the user device 305. In the illustrated embodiment, power source 320 is used to provide the necessary power to transmit pings or other signals, even when the user device 305 is not near enough to a signal processing device 105 to receive power from it. In an embodiment, the power source 320 is one or more batteries of any type. In some embodiments, one or more wireless interfaces 310 may be passive (e.g., passive RFID), while one or more wireless interfaces 310 may be active and require power source 320 (e.g., a longer-range 2.4 GHz transmitter).

In the illustrated embodiment, the signal processing device 325 includes a processor 330, one or more sensors 335, memory 340, storage 345, and a network interface 350. The processor 330 retrieves and executes programming instructions stored in memory 340 as well as stores and retrieves application data residing in storage 345 or memory 340. For example, a configuration for the signal processing device 325 may be stored in memory 340, storage 345. Processor 330 is representative of a single CPU, multiple CPUs, a single CPU having multiple processing cores, and the like. Memory 340 is generally included to be representative of a random access memory. Storage 345 may be a disk drive storage device, and may include fixed and/or removable storage devices, such as fixed disk drives, removable memory cards, or optical storage, network attached storage (NAS), or storage area-network (SAN).

In the illustrated embodiment, the signal processing device 325 includes one or more sensor(s) 335. The sensor 335 is generally configured to receive signals from user devices 305, such as illustrated by arrow 115 in FIG. 1. In one embodiment, the sensor(s) 335 can include various types of sensors, such as a long-range sensor or a short-range sensor. For example, in one embodiment, a short-range sensor 335 can detect signals from user devices 305 that are touching the sensor 335, or within a few inches. In contrast, in an embodiment, a long-range sensor 335 may be able to detect signals from user devices 305 up to several hundred feet away. In the illustrated embodiment, the signal processing device 325 further includes a network interface 350. This network interface 350 can be used to communicate with one or more servers, such as computing device 125, in order to transmit information about received signals, receive configuration information, and the like.

Figure 4:
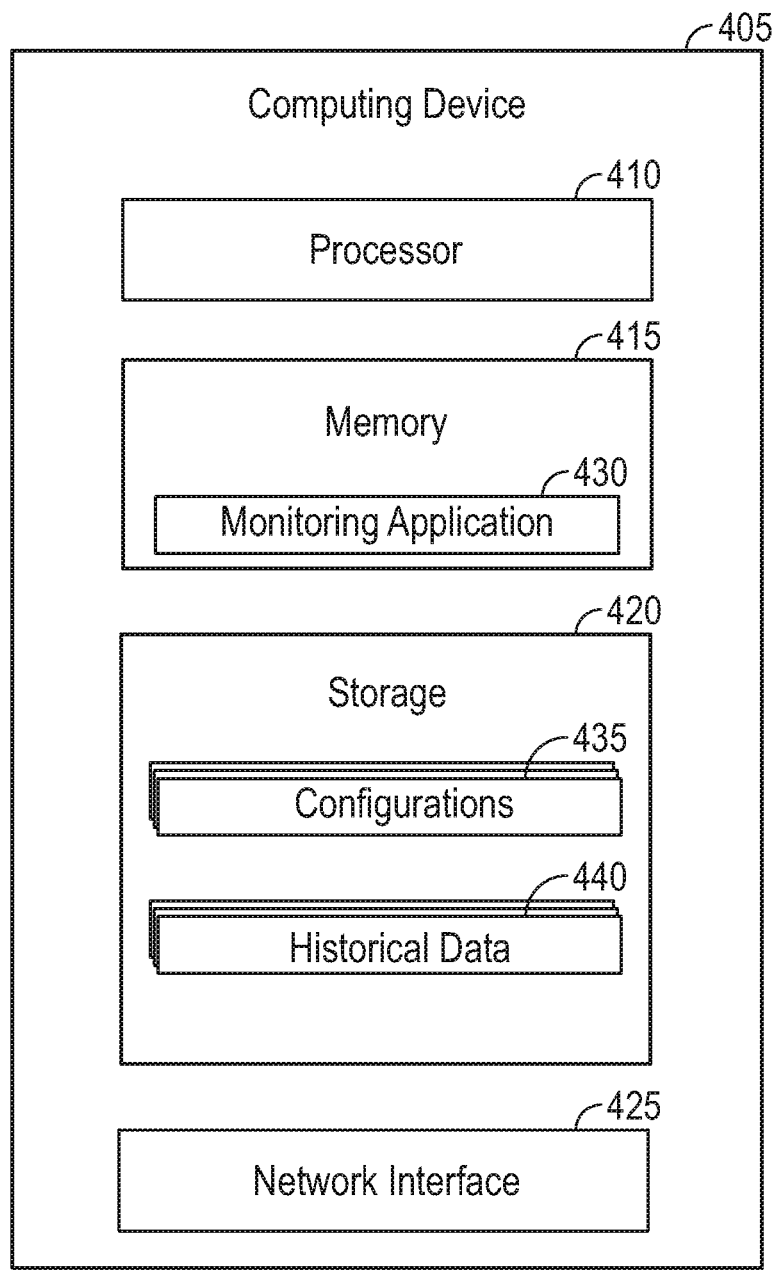
FIG. 4 is a block diagram of a computing device capable of implementing one embodiment to the present disclosure.

FIG. 4 is a block diagram of a computing device 405 capable of implementing one embodiment of the present disclosure. As illustrated, computing device 405 contains a processor 410, memory 415, storage 420, and network interface 425. The processor 410 retrieves and executes programming instructions stored in memory 415 as well as stores and retrieves application data residing in storage 425. Processor 410 is representative of a single CPU, multiple CPUs, a single CPU having multiple processing cores, and the like. Memory 415 is generally included to be representative of a random access memory. Storage 420 may be a disk drive storage device, and may include fixed and/or removable storage devices, such as fixed disk drives, removable memory cards, or optical storage, network attached storage (NAS), or storage area-network (SAN).

Computing device 405 can be used to manage the various signal processing devices 105 and beacons 245, and to process the spatiotemporal data that is generated. As illustrated, memory 415 includes a monitoring application 430, which will be described in more detail below. Furthermore, storage 420 includes configurations 435 and historical data 440. As illustrated, configurations 435 includes the settings and management options applied to each signal processing device 105 and beacon 245. In some embodiments, multiple signal processing devices 105 and/or beacons 245 can be grouped into a configuration 435, such as for a particular area or attraction. In the illustrated embodiment, historical data 440 can be generated by processing data collected over time from a number of user devices 102 and 235.

In an embodiment, this historical data 440 can include spatiotemporal data for each user device, or may include aggregated data from a number of user devices, in addition or in the alternative. In some embodiments, historical data 440 may be stored for each user device. In such an embodiment, the historical data 440 may include all data from each respective user device, or may include data received during defined windows of time, such as within the last year, the last month, the last day, and the like. In an embodiment, this data retains the identification information for the user device. In some embodiments, the historical data 440 further enables identification of the associated user. In other embodiments, however, the historical data 440 is anonymized or aggregated, for example, by removing unique identifiers that could be used to identify the user. In a related embodiment, the data is anonymized after a period of time, or after a specified event (such as the user leaving the area).

In some embodiments, historical data 440 includes aggregated data that is relevant to a particular location or area, regardless of the user device(s) that are included in the data. For example, in an embodiment, historical data 440 can include data about the wait time for a particular queue or a portion of the queue, or the amount of time users spend in a location (e.g., seated in a restaurant). This data may include a reference to each user device that it includes, or can be anonymized. In an embodiment, the historical data 440 includes data about spatiotemporal measures at various points of the day, and on various days. For example, the data can include an indication of the wait time for an attraction at different times of day, as well as on different days of the week and/or holidays.

Historical data 440 can be generated by processing data about user devices. For example, when a user enters a queue, pings from his or her user device 102 can be detected by a first signal processing device 105 that is configured as an "entry" reader. When the user subsequently exits the queue, an "exit" signal processing device 105 may detect pings from the user device 102. This data can be processed by a computing device (such as computing device 405) to determine a spatiotemporal measure relevant to the queue: the length of time that the user spent in the queue. This measure can then be aggregated with data collected from other users, in order to generate an overall average or estimated queue wait time.

Similar processing can be applied to other spatiotemporal measures, such as the length of time users wait for transportation, the time spent in transit, the time spent in a shop or restaurant, the time spent observing a display or other attraction, and the like. By referring to the historical data 440, administrators can better determine the expected burdens on various systems and the affect that these delays will have on user experience. In this way, administrators can determine whether additional queues are needed, whether optimizations in the process could be implemented to reduce the time required, and the like.

Although the illustrated embodiment includes monitoring application 430 on the same computing device as the configurations 435 and historical data 440, they may of course be located on disparate systems. For example, in an embodiment, the configurations 435 and historical data 440 reside on a cloud device or remote server, such that any number of administrators can access the data using a monitoring application 430 from any other device. Similarly, in an embodiment, processing the user device data can occur at a remote server, such as in the cloud, rather than on the device used by an administrator to manage the system.

Figure 5:
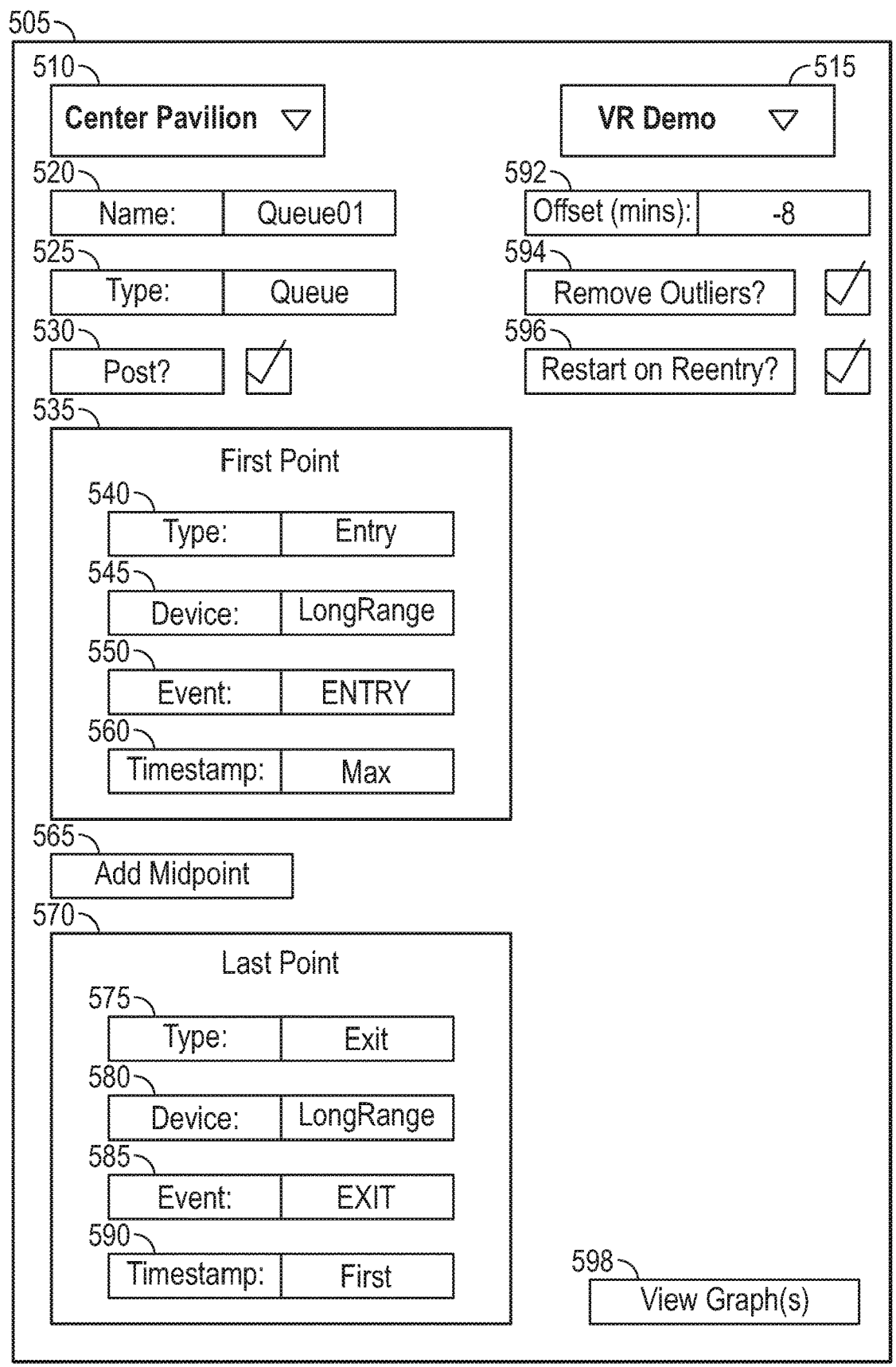
FIG. 5 illustrates a user interface according to one embodiment to the present disclosure.

FIG. 5 illustrates a user interface 505 according to one embodiment to the present disclosure. For example, the user interface 505 can be a part of the monitoring application 430. The user interface 505 is generally used by administrators to manage the configurations 435 of various signal processing devices 105 and beacons 245, as well as to process and view the historical data 440 collected. In the illustrated embodiment, users (e.g., administrators or employees) can select the configuration 435 for a given area, region, feature, attraction, shop, and the like using lists 510 and 515. For example, block 510 is a dropdown menu for selecting a park, region, or area that includes multiple interest areas or attractions within it, and block 515 is a dropdown menu for selecting a particular location or attraction in that broader region. As illustrated, the manager is viewing the configuration 430 for a virtual reality (VR) demonstration booth, which is located in the Center Pavilion (e.g., at a trade show or convention).

In related embodiments, users can select configurations 435 based on other criteria. For example, in an embodiment, the manager can filter the configurations 435 to enable selection from a list of all restaurants, all rides, all queues, all transportation, all demonstration booths, and the like. Similarly, in an embodiment, the user can search for a configuration 435 based on various criteria, including the name of the associated feature or area, the name of the configuration 435, and the like. In the illustrated embodiment, the configuration 435 for the VR demonstration includes a number of fields. A "Name" field 520 is used to name the configuration 435. Field 525 includes the type, which in the illustrated embodiment, is "queue." That is, the illustrated configuration 435 applies to a queue for the VR demonstration located in the center pavilion.

The type of a configuration generally refers to the spatiotemporal measure that it is related to. In various embodiments, there can be various types of configuration 435. For example, other types can include "dwell," which is used to determine the length of time that users spend in a given area or location. Similarly, other types include "transit" or "travel", which are related to the length of time users spend traveling between locations, "wait" configurations, which can be for a queue, or can be waiting for a shuttle or other transportation, and the like. In some embodiments, each type may have one or more subtypes. For example, a "queue" type may include subtypes for different types of queues, such as a first type for the main queue that most users use, and a second type for a secondary queue that allows users to skip the main queue.

Field 530 is used to indicate whether the data collected should be posted to a particular system or not. For example, in an embodiment, the data can be collected and processed, but not posted to a database (such as one including historical data 440) for various reasons. Similarly, in some embodiments, the aggregated spatiotemporal measures can be posted to signs or screens to inform users, can be posted to an application or web server that users can access from a mobile device, and the like. In this way, administrators can determine whether users are provided with updated spatiotemporal measures or not.

Each of blocks 535 and 570 represent a signal processing device 105 or beacon 245. Further, button 565 may be used to add one or more additional signal processing devices 105 and beacons 245, as needed for the particular configuration 435. Furthermore, though configurations 435 used to monitor the time it takes users to move between two points might require two or more signal processing devices 105 or beacons 245, some configurations 435 require a single signal processing device 105 or beacon 245. For example, a single signal processing device 105 can be included in a theater to determine how long users spend in the theater. Similarly, a signal processing device 105 or beacon 245 can be placed in a cart, bag, or other movable thing that accompanies an entertainer or other moving attraction in order to monitor users who are exposed to the attraction, and how long users spend observing it.

As illustrated, block 535 relates to a first point for users entering a location, queue, and the like. Specifically, the type 540 is defined as an "entry" signal processing device, indicating that it is placed at the entrance to the VR demonstration queue. Furthermore, as illustrated, the entry signal processing device for the VR demonstration includes a long-range sensor 545. That is, the signal processing device 105 used to mark the entry for the VR demonstration queue is able to detect users at a relatively long range. In an embodiment, signal processing devices 105 may either be short-range, such as touch readers, where the user must place the user device 102 in close proximity to the device (e.g., touching, or within inches), or long-range readers that can be configured to detect user devices 102 up to several hundred feet away. Of course, as discussed above, long-range readers can be further configured to register pings with sufficiently strong signals, such that the signal processing device 105 can be refined to detect user devices 102 within a desired distance, such as a few feet.

As indicated by field 550, the event triggered by the signal processing device 105 is an "ENTRY." This indicates that pings detected by the signal processing device associated with block 535 are to be classified as "start," "entry," or "begin" signals. Of course, in some embodiments, a single signal processing device 105 or beacon 245 may be both an entry and exit, for example, if the signal processing device is used to determine dwell times in a theater. Field 560 indicates which ping should be considered when processing the data for each user device 102. As illustrated, the "max" ping is the ping that triggers the "ENTRY" for the associated user device 102. That is, the time at which the strongest signal is registered by the associated signal processing device 105 is used as the entry time.

Block 570 corresponds to a signal processing device placed at the last point in the VR demonstration queue. Similar to the first point, the block includes configurations for the type 575, device 580, triggered event 585, and timestamp 590. The configuration 435 also includes an offset field 592, an option to remove outliers 594, an option to restart time on reentry 596, and a button that allows the manager or administrator to view graph(s) 598, such as graphs representing historical data 440. Field 592 allows the administrator to include an offset to the data as part of the processing. For example, in an embodiment, an administrator may want to adjust the aggregated spatiotemporal measure before it is posted to one or more databases, and before it is displayed on signs and/or webpages. Of course, in various embodiments additional options may be available, such as removing entries that are out-of-sequence.

Administrators may want to adjust the aggregate measure for a variety of reasons. For example, if a queue takes 8 minutes to walk from beginning to end when there is no wait (e.g., no people in the line), the estimated spatiotemporal measure generated by aggregating user data will be about 8 minutes, even though there is zero wait for the queue. Thus, the administrator can adjust the configuration 435 to subtract 8 minutes from the estimated spatiotemporal measure, or from the generated spatiotemporal measure for each user. Similarly, the system can be configured to set the estimated spatiotemporal measure equal to zero if it is at or below 8 minutes.

Additionally, in some applications, an attraction may utilize a signal processing device 105 at the beginning of the queue, but no signal processing device 105 at the end of the queue. For example, an attraction can use one signal processing device 105 to detect when users enter the queue, and a second signal processing device 105 to detect when users exit the attraction (e.g., exit the theater, leave the ride, leave the booth, etc.), but no signal processing device 105 to detect the "load" point, e.g., when users exit the queue and enter into the attraction. In such an embodiment, the offset can be used to adjust the estimated spatiotemporal measure based on the length of time the attraction lasts. For example, if a theater show lasts 15 minutes, those 15 minutes can be subtracted from the spatiotemporal measure to account for the show length, so that the spatiotemporal measure indicates how long the wait was from entering the queue to the beginning of the show.

Furthermore, in some embodiments, administrators may need to adjust the offset up or down based on quirks in the system. For example, if it is determined that the estimated spatiotemporal measure is always longer or shorter than the actual wait time for the attraction, the offset 592 can be adjusted to make the measure more accurate to give administrators time to determine why the estimates are inaccurate, and correct any problems.

The remove outliers option 594 can also be used to improve the accuracy of the estimated spatiotemporal measures. Outliers may be the result of a variety of factors. For example, if a user stops in the middle of the queue and allows other users to pass, their data will be longer than the actual wait time. Similarly, if a user skips ahead of users, their wait time will be shorter than the actual wait time. Additionally, in some embodiments, individuals with disabilities or with a particular status (e.g., VIP guests) may use alternate queues or paths that skip portions of the line, thereby resulting in detected wait times that are below the actual wait time for the attraction.

Removing outliers can involve processing the data in a variety of different ways, according to various embodiments. In an embodiment, the generated spatiotemporal measures for each user device 102 are aggregated to form an estimated spatiotemporal measure. For example, wait times from each user device 102 are aggregated to form the estimated wait time, and individual wait times that exceed a predefined amount above or below the estimated wait time can be removed from the data set. The estimated wait time can then be recalculated without the outliers. In an embodiment, the threshold used to detect and classify outliers can be a simple percentage (e.g., values shorter than 80% of the estimated value or greater than 120% of the estimated value are outliers), based on standard deviations (e.g., wait times greater than one standard deviation from the estimated measure are outliers), and the like.

In an embodiment, the wait times for the user devices 102 are processed using a clustering algorithm to determine outliers. In such an embodiment, wait times that fall outside of the main cluster (e.g., the cluster that most users fit into) or outside of a predefined time from the main cluster can be classified as outliers. In a related embodiment, one or more clustering algorithms can be used to cluster the wait times and determine an estimated spatiotemporal measure for each cluster. For example, in some applications, an attraction may have multiple queues, such as a first main queue for most users, and a shorter or faster queue for users with a special permission or ticket. In this way, the estimated wait time for each queue can be determined even when the queues share signal processing devices 105.

In an embodiment, removing outliers involves ignoring data collected from a user if the sequence of users before or after the user changes. For example, the system may detect user X entering the queue with users V and W entering just before and users Y and Z entering just after. If, when user X exits the queue, it is determined that Users V and W exited prior to user X, it can be determined that user X's wait time is likely not accurate, and his data can be ignored.

In another embodiment, removing outliers includes removing data from users who exited and reentered the queue. For example, if a user is determined to have entered the queue at a first time, and later, before being identified at the exit point, is detected as entering the queue again, it can be determined that the user must have exited the queue prior to the end, and has reentered. In this embodiment, the system can process the data in a variety of ways. For example, as above, the system may simply ignore the wait time data for this user device 102 when calculating the estimated measure. In other embodiments, the system can be configured to use the most recent "ENTRY" event when calculating wait time, so as to prevent inaccuracy.

Figure 6:
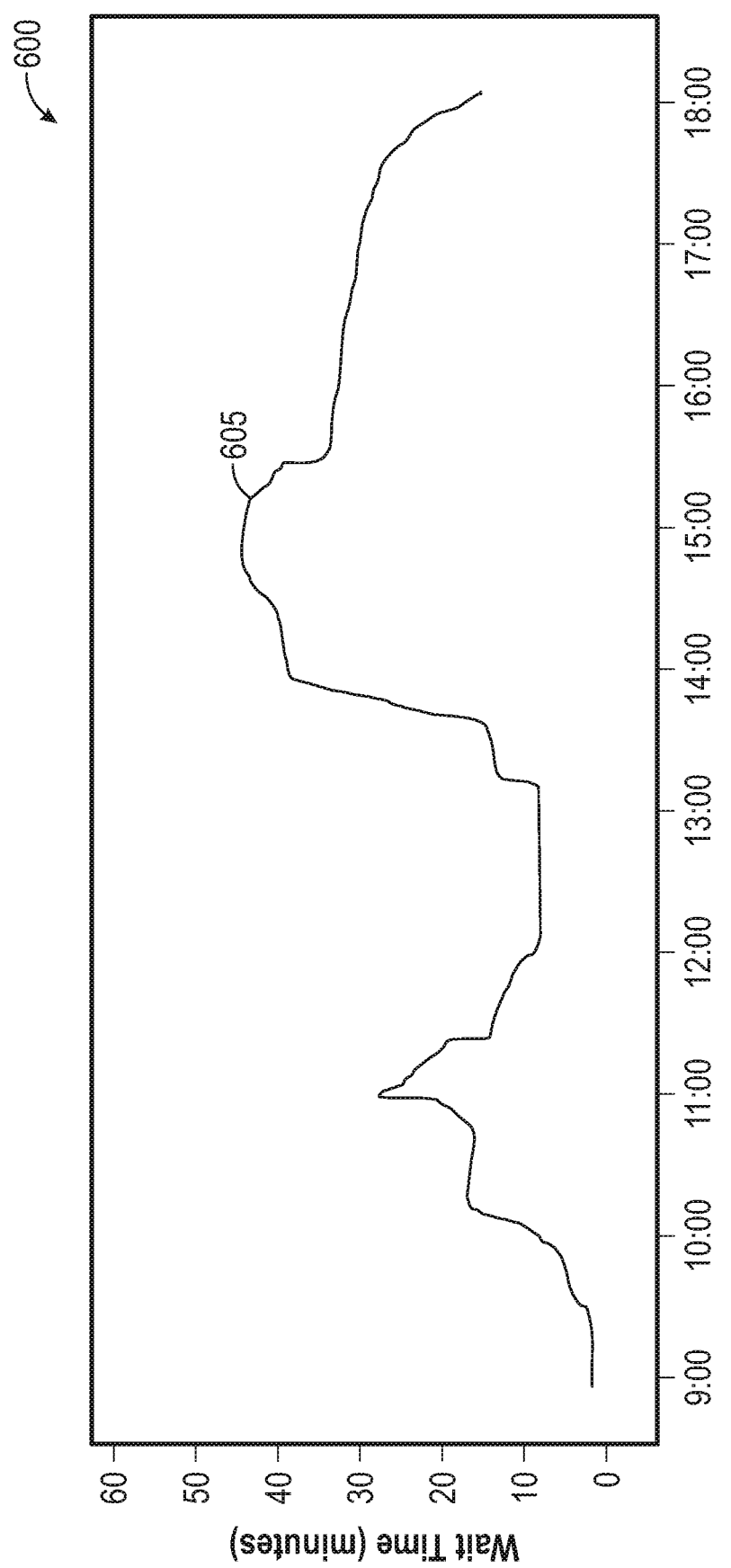
FIG. 6 is a graph illustrating wait time throughout a day, according to one embodiment to the present disclosure.

FIG. 6 is a graph 600 illustrating wait time throughout the day, according to one embodiment to the present disclosure. As illustrated, the spatiotemporal measure (wait time) is depicted using a line 605. For example, the graph 600 can be generated using data obtained from user devices 102, as discussed above. Similarly, the graph 600 may correspond to wait times at a particular attraction, such as the VR demonstration discussed above, or any other feature for which users must wait in a queue. Furthermore, as discussed above, similar graphs can be generated in various embodiments for each spatiotemporal measure. For example, a similar graph can be created for dwell time in a restaurant or other area, transit time on a shuttle, wait time for a taxi, and the like. Additional examples of spatiotemporal measures that can be measured and processed include various arrival metrics (how long does it take for the users to actually enter a park or area), how long it takes for users to get from the start of the line to a register and how long it takes the ordered food to arrive once it has been ordered.

As discussed above, spatiotemporal measures can be generated by aggregating user data in a variety of ways. In one embodiment, the estimated spatiotemporal measure is to the average or mean of the individual spatiotemporal measures. In another embodiment, the estimated spatiotemporal measure if the median of the generated spatiotemporal measures for each user device, or the mode. Of course, any other technique to aggregate the data can be used in various embodiments. In order to determine the estimated spatiotemporal measure at a given time, the determined spatiotemporal measures for each user device 102 corresponding to a particular window of time can be used. That is, a spatiotemporal measure corresponding to a particular user device 102 may have "occurred" during a particular window if the "END" signal was received during that window of time. For example, if a signal processing device detected that the user exited a queue, boarded a ride, left a restaurant or area, and the like.

In an embodiment, at any given point in time, the estimated spatiotemporal measure can be generated by aggregating all individual spatiotemporal measures that were determined during a period of time immediately preceding the selected point in time. That is, a sliding window can be used, such as the last 3 minutes, the last 5 minutes, the last 10 minutes, and the like. In a related embodiment, a sliding window can be used that includes a predefined amount of time after the selected time. For example, for each moment in time, the estimated spatiotemporal measure can be generated by aggregating each individual measure that was determined within 3 minutes before or after the moment in time. Of course, if a real-time spatiotemporal measure is desired, a sliding window of time prior to the current moment can be used, and the estimated spatiotemporal measure may be updated using the subsequent window of time if desired before, for example, committing it to a database of historical data 440.

In an embodiment, spatiotemporal measures are determined for users for a predefined window of time, and at the end of the window, the data can be aggregated to generate the updated estimated spatiotemporal measure. For example, spatiotemporal data can be collected for a predefined period of time and then aggregated to generate the estimated spatiotemporal measure. In such an embodiment, the estimated spatiotemporal measure is not updated again until the predefined period of time has elapsed, and the associated measures collected during that window are again aggregated.

As illustrated, the spatiotemporal measure (e.g., wait time) is relatively short at 9:00, (less than 5 minutes), and slowly ramps up to a plateau just after 10:00 at about 20 minutes. The wait time then peaks at 11:00 at about half an hour, before dropping over the lunch hour. Further, between 13:00 and 14:00, the time again increases rapidly and remains relatively high throughout the day. In an embodiment, the graph 600 reflects the generated estimated spatiotemporal measure at any given point in time during a particular selected day.

In other embodiments, the line 605 can reflect the aggregate of estimated spatiotemporal measures that were generated over several days. For example, for each moment in time on the graph 600, the estimated spatiotemporal measures corresponding to that time on any number of previous days may be aggregated. In an embodiment, the administrator can select whether they want to visualize the data from a particular day or aggregated from multiple days. For example, an administrator can use monitoring application 430 to generate a graph 600 that aggregates the estimated spatiotemporal measures across all week days (e.g., Monday through Friday), or a graph illustrating the aggregated spatiotemporal measures across weekends (e.g., Saturday and Sunday) may be generated.

Similarly, in an embodiment, a graph representing data gathered on a particular day of the week can be generated (e.g., on Mondays only, or on Fridays only). Additionally, in a related embodiment, data from a selected set of days can be aggregated (e.g., the last five Mother's days, all weekdays during the last three weeks, etc.). An administrator viewing the graph 600 can thereby determine what dates and times the particular feature or attraction associated with the graph is busier, and therefore may require additional staffing.

Similarly, it can be easily determined which times are less busy, and therefore times at which the administrator may be able to reduce staffing. Of course, such a determination could also be made by one or more computer processes or models.

Figure 7:
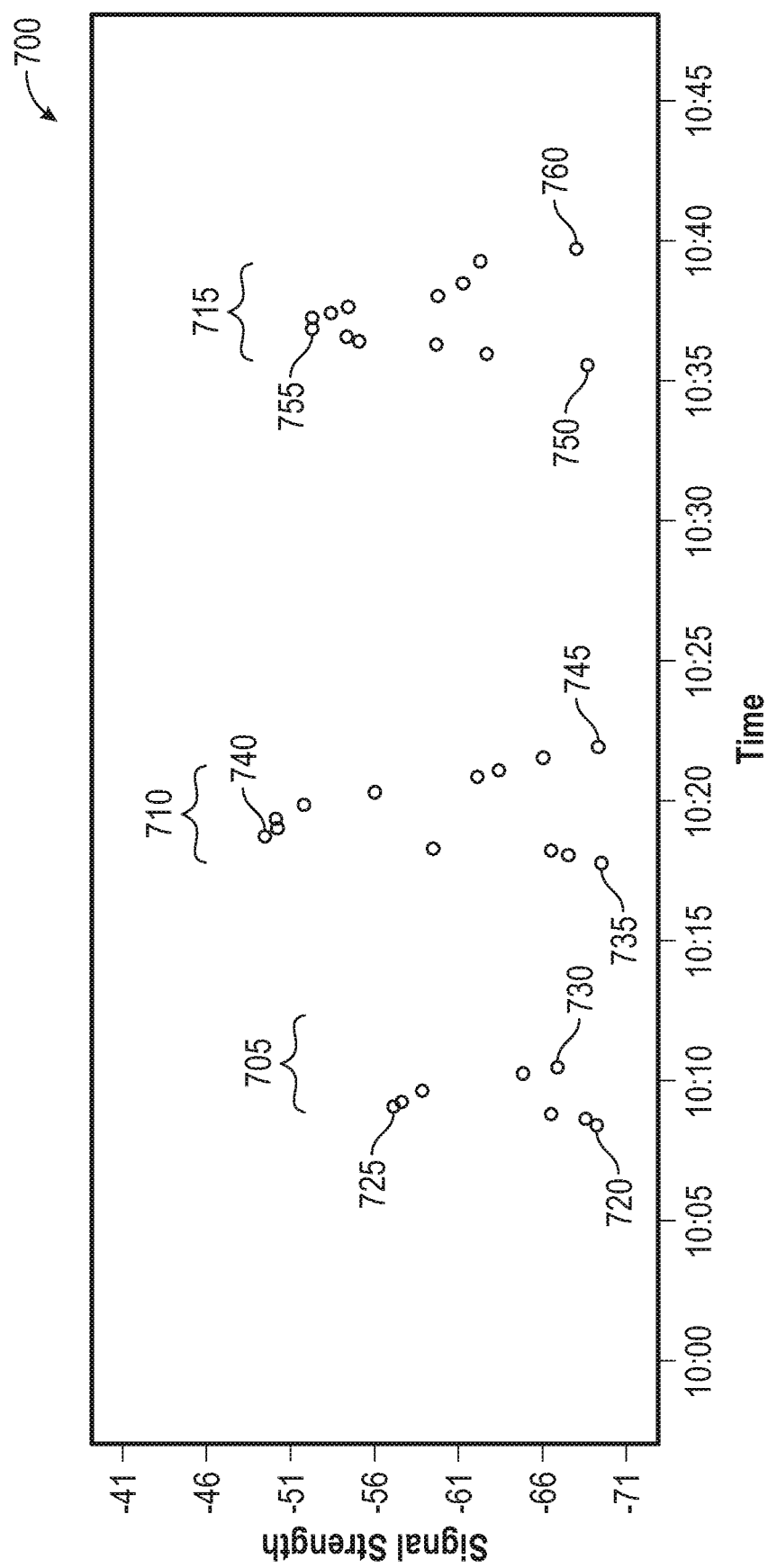
FIG. 7 is a graph illustrating detected signals, according to one embodiment to the present disclosure.

FIG. 7 is a graph 700 illustrating detected signals, according to one embodiment to the present disclosure. The graph 700 plots each ping received at a signal processing device 105 from a user device 102 based on the time it was received and the strength of the signal. As illustrated, the detected signal strength of the signal is plotted on the vertical axis, while the timestamp of each signal is on the horizontal axis. In the illustrated graph, each ping is represented as a small circle. Additionally, in the illustrated embodiment, the pings were detected by three different signal processing devices 105 at various times. Specifically, each of the pings located within area 705 of the graph 700 were detected at a first signal processing device 705, the signals within area 710 were detected at a second signal processing device 710, and the pings under area 715 were detected using a third signal processing device 715.

Notably, FIG. 7 illustrates a plurality of signals received from a single user device 102 over a window of time. In practice, each signal processing device 105 is of course likely to receive signals from many user devices 102 during a given window of time. In an embodiment, each signal processing device 105 sorts and filters the received signals based on the user device 102 that transmitted it, before transmitting the data to the computing device 125. In other embodiments, computing device 125 sorts and filters the signals based on the user device 102. As illustrated, each signal processing device 105 detected the user device 102 for a relatively brief period of time. As discussed above, a user device 102 can send out continuous transmissions, or may send periodic pings.

As illustrated in FIG. 7, the received signals at each signal processing device 105 increase in signal strength before peaking at a maximum strength, and then decrease again. This may be because the user associated with the user device 102 was moving in relation to the signal processing device 105. For example, as the user got closer to the signal processing device 105, the detected signal strength increased. When the user began moving further away, for example, because he had passed the signal processing device 105, the detected signal strength begins to decline again. Furthermore, in some embodiments, each signal processing device 105 can be configured with a threshold for detected signals. In an embodiment, adjusting the threshold involves instructing the signal processing device 105 to discard or ignore signals that fall below the threshold signal strength. In other embodiments, all detected signals are transmitted to the computing device 125, which applies the appropriate threshold for each signal processing device 105 (based on the respective configuration) to determine which signals to discard or ignore.

In the illustrated embodiment, the user device 102 was first detected by signal processing device 705 at about 10:08, as illustrated by point 720. Shortly after, at about 10:10, the last signal was received by signal processing device 705, as illustrated by point 730. Furthermore, as illustrated by point 725, the strongest signal that signal processing device 705 detected was received at approximately 10:09. Additionally, as illustrated, signal processing device 710 first detected the user device 102 at about 10:17, as illustrated by point 735, and the last signal received by signal processing device 710 from the user device 102 occurred at approximately 10:22. The strongest signal that signal processing device 710 received is indicated by point 740. Additionally, first signal received by signal processing device 715 is indicated by point 750, the last signal detected by signal processing device 715 is indicated by point 760, and the strongest signal that signal processing device 715 detected is indicated by point 755.

In an embodiment, a signal can be identified as the "first" signal at a signal processing device because it is the first signal received for a predefined period of time. For example, if it is the first signal the particular signal processing device has detected from the user device 102 in the last thirty seconds, it may be classified as the "first" signal of a new detection. Similarly, in an embodiment, the "last" signal may be classified as the last signal because no other signals are received from the respective user device 102 for a predefined period of time after, such as thirty seconds. Of course, as discussed above, the selected threshold may also be used, such that the "first" signal is the first sufficiently strong signal over a period of time, and the "last" signal is the last sufficiently strong signal for a period of time. Additionally, in an embodiment, the "strongest" or "max" signal strength for a given detection can be identified as the strongest signal that was received between a "first" signal and the corresponding "last" signal.

In an embodiment, a manager or administrator can use the interface 505 to generate the graph 700 for a particular signal processing device 105 or set of signal processing devices. Similarly, in an embodiment, the administrator can use the interface 505 to view all signals at a particular signal processing device 105, all signals from a particular user device 102, and the like. In an embodiment, the manager can select one or more of the points to see additional information. For example, the precise time at which the signal was received can be provided, as well as the detected signal strength. In some embodiments, the administrator can use the interface 505 to view all user devices 102 that are currently in an area/queue, based on the signals recently detected by the associated signal processing device(s) 105.

As discussed above, the detected signals can be used in a number of ways, according to the respective configuration 435 for the signal processing device(s) 105 that received the signals. Initially, each signal processing device 105 can have a threshold set to classify a signal as the "first," "strongest," or "last." In an embodiment, the threshold can be different for each classification. For example, identifying the "first" signal may involve a relatively higher signal strength than determining which signal is the "last." Furthermore, each signal processing device 105 may have different signal strength requirements, even within a common configuration 435. For example, in the illustrated embodiment of FIG. 7, the threshold for signal processing device 705 may be set to −65 dBm, while the threshold for signal processing device 715 is −55 dBm. That is, a user device 102 might need to be closer to signal processing device 715 than it must be to signal processing device 705 in order for the signals to be used to be considered "valid" to generate the spatiotemporal measure.

As illustrated in graph 700, the time from the first signal received at the first signal processing device 705 was about 10:08, while the last signal received at the last signal processing device 715 was received at about 10:40. Depending on the configuration 435 associated with the signal processing devices 705, 710, and 715, the generated spatiotemporal can be generated in a variety of ways. For example, if the signal processing device 705 is configured to refer to the "max" signal strength and signal processing device 715 is configured to utilize the "last" received signal, the spatiotemporal measure will be the time that elapsed between point 725 and point 760, or about 31 minutes. If, however, the signal processing device 715 is configured to utilize the first signal received, the elapsed time concludes at about 10:35, and the spatiotemporal measure is about 26 minutes.

The appropriate configuration 435 varies based on the application used. For example, if the signal processing devices 705, 710, and 715 are used in a queue, the administrator may wish to identify the strongest signal at the entry signal processing device 705 as the "entry" time. This may be useful to, for example, prevent identification of the user before he actually enters the queue. In other embodiments, however, the "start" time should be defined by the first or last signal received, depending on the administrator's preference and the specifics of the application.

The illustrated embodiment includes a midpoint signal processing device 710. In an embodiment, this signal processing device 710 can be used to calculate two separate spatiotemporal measures for each portion of a queue or total spatiotemporal measure. For example, in an embodiment, the signal processing devices 705, 710, and 715 may be arranged for a queue, and signal processing device 710 may be located at a "merge" point where two or more lines merge together. Similarly, in an embodiment, the signal processing device 710 can be placed at a point where users board a vehicle, and signal processing device 715 may be placed where the users actually exit the area. Of course, any other arrangement of signal processing devices 705, 710, and 715 can be used in order to capture the desired spatiotemporal metrics. Additionally, in some embodiments, a single signal processing device 105 may be used, in order to determine the amount of time a user dwelled, waited, or remained in a single area.

Although in the illustrated embodiment, multiple signals are received at each signal processing device 705, 710, and 715, some or all of the signal processing devices may of course be a touch reader that receives a single signal from each user device 102. In an embodiment including one or more touch signal processing devices, the relevant signal is frequently the only identified signal, as opposed to the first, last, or strongest.

Figure 8:
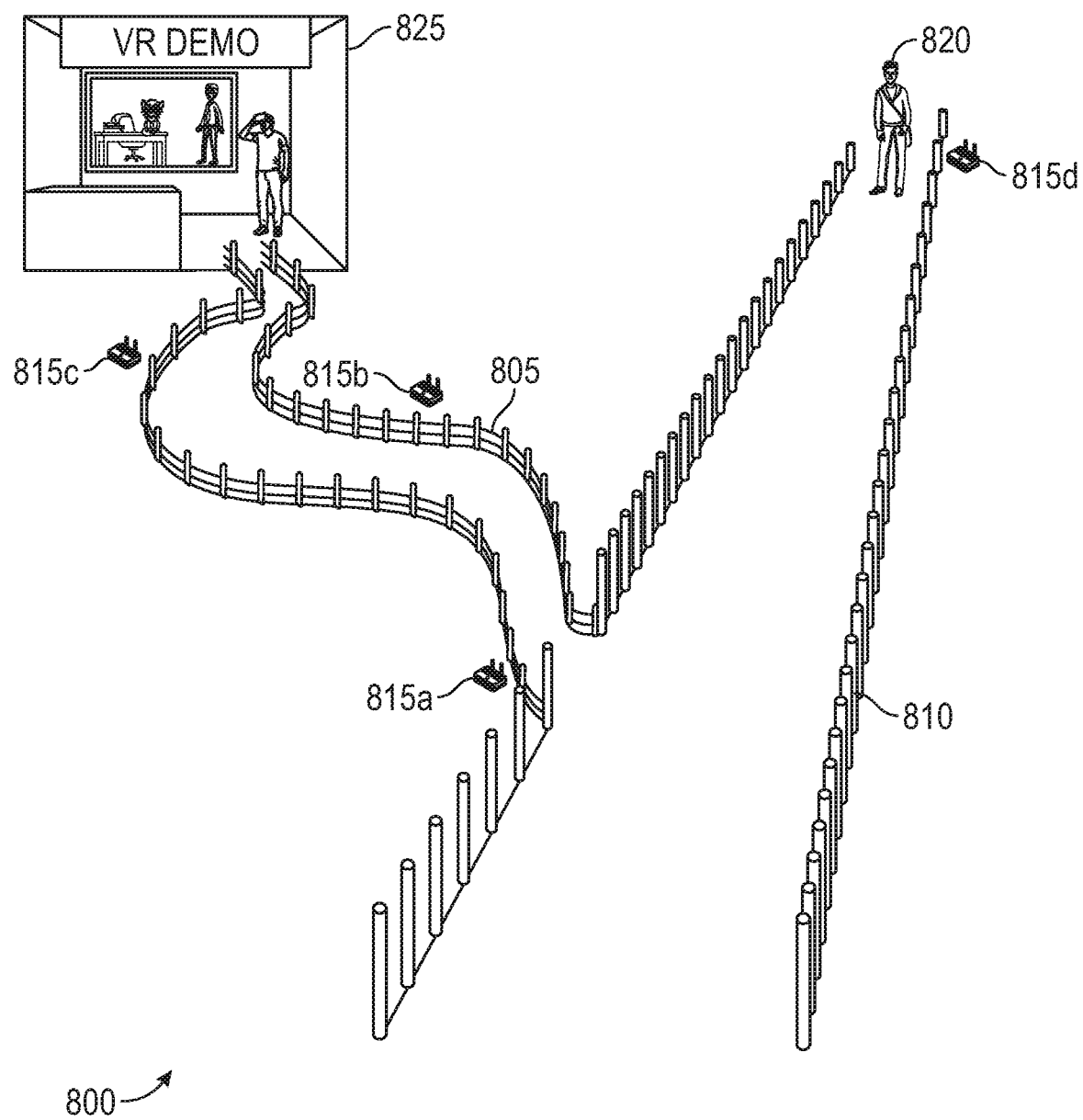
FIG. 8 illustrates a region with a queue and an attraction, according to one embodiment to the present disclosure.

FIG. 8 illustrates a region 800 with a queue 805 and a path 810, according to one embodiment to the present disclosure. In the illustrated embodiment, the pathway 810 is a sidewalk or other thoroughfare that users utilize to move between locations. Similarly, queue 805 is a line that users proceed through in order to reach an attraction 825, such as a demonstration of new technical advancements at a convention or trade show. Furthermore, the location includes an attraction 820 on path 810, such as a street performer, a meet and greet with a character from a book, movie, or TV show, and the like. Generally, the attraction 820 can be anything for which the administrators would like to gather spatiotemporal data, including displays, seating areas, and the like. In the illustrated region 800, four signal processing devices are arranged. Signal processing device 815a is placed at the beginning of the queue 805, for example to detect entry into the queue 805. Signal processing device 815b is located midway through queue 805, and signal processing device 815c is placed at the end of the queue 805 and at the entry into the attraction 825.

Additionally, a signal processing device 815d is located near attraction 820. In some embodiments, if the attraction 820 is movable, such as a street show, performer, character, consultant, employee, or actor that moves through the area, the signal processing device 815d is also movable so as to stay near to the attraction 820. For example, depending on the particular attraction, the signal processing device 815d can be placed in a cart or bin that the performer pushes, integrated into a costume or prop that the performer uses, or placed in a pack or bag that the performer carries. Similarly, signal processing device 815d can be transported by a separate employee or helper that stays with the attraction 820 or person as it moves.

In the illustrated region 800, the signal processing devices 815a-d are depicted as if they are visible (e.g., sitting on the ground) in order to facilitate understanding of the illustrated figure. Of course, in many embodiments, one or more of the signal processing devices 815a-d may be hidden or obscured such that users and guests do not see them and may not even know they are present. For example, as discussed above, the signal processing devices 815a-d may be hidden inside a bag, cart, or other item. Similarly, each signal processing devices 815a-d can be placed under the floor of the queue 805, above a ceiling tile, inside of a bush or prop, and the like. In this way, the spatiotemporal data can be collected without affecting the immersion and enjoyment of the users.

The signal processing devices 815a-d can be used with a variety of configurations to determine different spatiotemporal measures. For example, the length of time people spend observing the attraction 820 can be determined using signals received at signal processing device 815d. In an embodiment, the length of time that each user dwells is determined based on the time that elapses between the first signal (from the associated user device 102) exceeding a threshold and the last signal exceeding a required threshold. In this way, an estimated spatiotemporal measure can be generated based on any number of individual user devices 102, in order to determine how long the average user spends observing the attraction 820 and how many users observe the attraction 820 at any given moment.

As discussed above, the threshold can be set in a number of ways. In an embodiment, an administrator may set the threshold to register signals above a predefined level, and the resulting data can be analyzed to determine whether the thresholds should be adjusted. For example, initially, the threshold might be set to identify user devices 102 that are within ten feet of the attraction 820. During use, it can be determined that guests frequently observe the attraction 820 from as far as forty feet away, and the threshold should therefore be adjusted, such as by lowering the detected signal strength required to register as a ping. Similarly, if in operations signal processing device 815d detects users who are simply walking past at a distance, the threshold should be lowered to only detect individuals who are closer.

Similarly, multiple spatial and temporal measures can be determined utilizing the same data. For example, in addition to determining how long users remain within a predefined distance from the attraction 820, the distance that users remain from the attraction 820 can be determined, as well as the time users spend observing the attraction 820 before approaching it. In order to determine the distance that users tend to remain away from the attraction 820, the ping associated with the maximum signal strength can be used. As the user draws closer to the signal processing device 815d, the signal strength will increase. Based on the maximum signal strength from each user device 102, the system can determine an estimated distance that users keep between themselves and the attraction 820. In various embodiments, data from user devices 102 with a maximum signal strength below a threshold may be excluded, as well as data from user devices 102 that was received for less than a predefined time limit (e.g., because the user walked past without stopping to observe).

In a related embodiment, the user device 102 data can be used to determine how long users observe attraction 820 before approaching. For example, the timestamps of the first detected signal and the maximum signal can be used to determine when the user first began observing the attraction 820, and when they approached the attraction 820, for example, to take a picture or ask for an autograph. As above, this data can be aggregated to determine the overall spatiotemporal measures.

In an embodiment, the data is aggregated within different classes of users. For example, data from users below a predefined age may be aggregated into a first spatiotemporal measure, while data associated with users older than a predefined age can be aggregated to create a second estimated spatiotemporal measure. These measures are useful to determine how long users of various age groups observe the attraction 820, how close each age group gets, and how long it takes each age group to work up the courage to approach. In this way, the attraction 820 can be modified to better attract users of whatever age group(s) the managers would like to target.

Although illustrated as a performer, attraction 820 can be any feature, location, or thing that administrators would like to collect data about. For example, in an embodiment, the signal processing device 815*d* is placed near a bench or other seating area to determine how long people remain. Similarly, the signal processing device 815*d* can be located near an entrance or exit to an area and used to determine how much time users spend in the area. In some embodiments, multiple signal processing devices are used in conjunction. For example, a different signal processing device may be associated with each of a number of performers that remain together, or a different signal processing device can be placed at each entrance or exit to an area.

As illustrated, the queue 805 is associated with three signal processing devices 815*a-c*. For example, signal processing device 815*a* could correspond to signal processing device 705 in FIG. 7, signal processing device 815*b* could correspond to signal processing device 710, and signal processing device 815*c* could correspond to signal processing device 715. In addition to wait time, the signal processing devices 815*a-c* can be used to determine other spatiotemporal measures, such as the length of the line at any given moment or the number of users in the queue 805. For example, if user devices 102 are detected passing by signal processing device 815*a* relatively quickly, it can be determined that the line does not extend back that far, and users are simply walking past the device. Similarly, if there is another entrance into the queue (or the queue includes an extended area that is used when the line gets too long), whether or not user devices 102 are detected at all can indicate where the end of the line is located.

In various embodiments, data from the signal processing devices 815*a-c* can be processed in various ways to generate estimated spatiotemporal measures. For example, in embodiments, the data can be processed to account for users who hesitate before entering the queue. For example, if a user device 102 is detected by signal processing devices 815*a*, 815*b*, and finally 815*c* in order, it can be determined that the user proceeded through the line as normal. If the detections are out of order, or other signal processing devices detected the user as well, however, it can be determined that the user did not proceed normally and their data can be adjusted or excluded.

For example, if a user is first detected by signal processing device 815*a*, then signal processing device 815*d*, followed by 815*a*, 815*b*, and 815*c*, the data can be processed to ignore the first detection by signal processing device 815*a*, because the user did not actually enter the queue at that time. However, the data beginning with the second detection at signal processing device 815*a* can be used to determine the wait time. Additionally, if a user device 102 is detected for a relatively long period of time at a signal processing device (such as signal processing device 815*a*), as compared to other user devices 102 at similar times, it can be determined that the user likely dwelled near the signal processing device 815*a* for a longer period of time than most, for example because he or she was deciding whether to enter the queue.

Similarly, if the user device 102 is first detected by signal processing device 815*a*, then 815*b*, then 815*a* again, and finally 815*b* and 815*c*, it can be determined that the user began to proceed through the queue, but moved backwards through the queue or otherwise left the queue for a time. In response to this determination, the computing device 405 may exclude data from the user device 102 when generating the estimated measures, or may adjust it other ways. In an embodiment, if the user device 102 is not detected by any of the signal processing devices 815*a-c* for a predefined period of time, the user data can be ignored or adjusted. For example, if none of the signal processing devices 815*a-c* associated with the queue receive a signal from the user device for a period of time, e.g., thirty seconds, it can be determined that the user exited the queue. In such an embodiment, the user's wait time may be restarted upon detection at the entry signal processing device 815*a*, or may simply be discarded.

In addition to considering the order which signal processing devices detected the user device 102, data from a user device 102 can be classified as invalid (and therefore ignored or adjusted) based on a variety of other methods. For example, in various embodiments, the sequencing of the user devices 102 may be determined, the categories or classifications of the user devices 102 or associated users might be considered, the elapsed times for each user device 102 (and how far the determined time is from the mean or median) may be relevant, and the like. Generally, in embodiments, the computing device 405 can determine the validity of the data in any number of ways. If the data is determined to be invalid, it can be excluded from the estimated spatiotemporal measure. Alternatively, in some embodiments, the data may be adjusted in various ways to correct the invalidity or imperfection.

Figure 9:
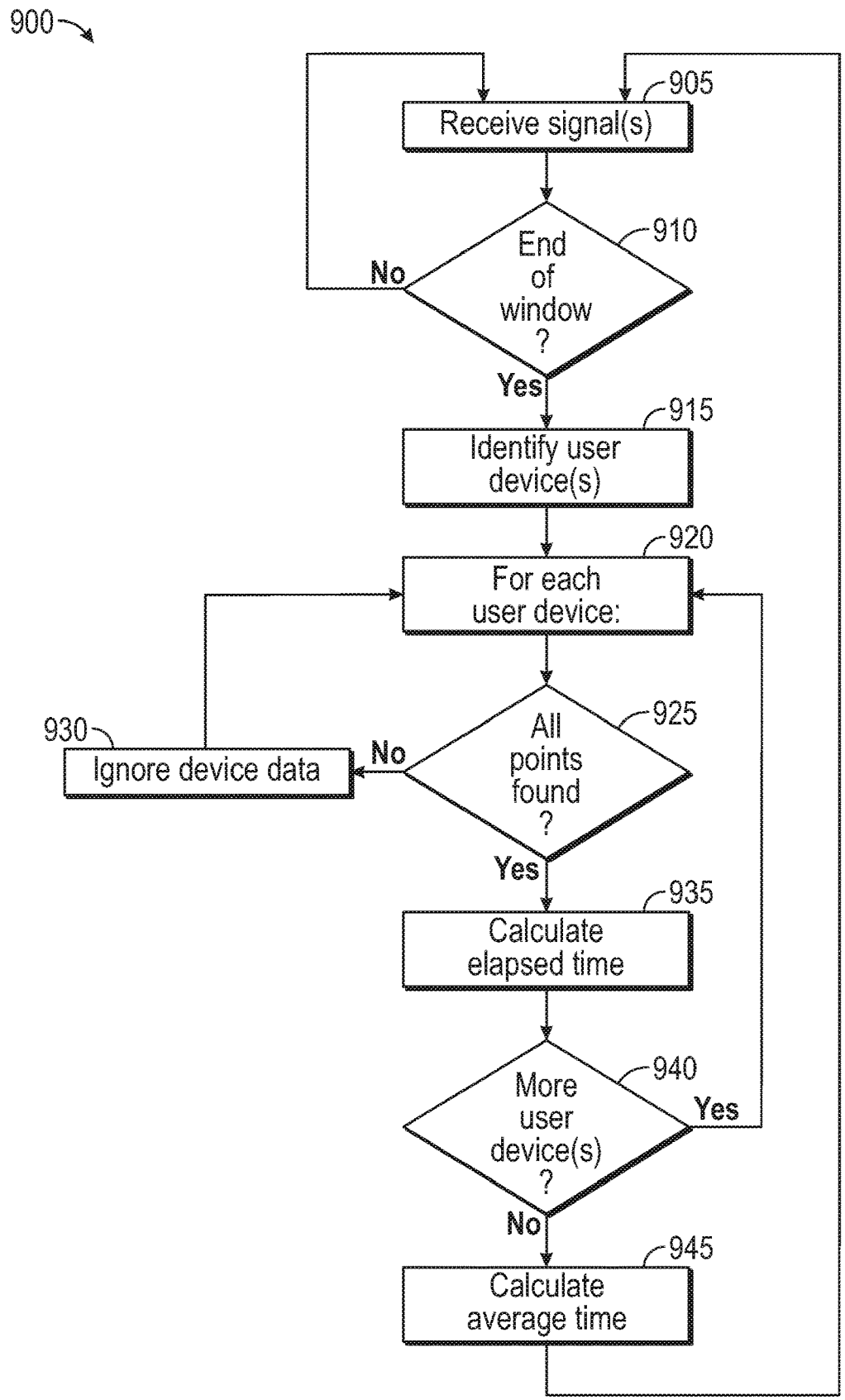
FIG. 9 illustrates a flowchart for a method of processing spatiotemporal data, according to one embodiment to the present disclosure.

FIG. 9 illustrates a flowchart for a method 900 of processing spatiotemporal data, according to one embodiment to the present disclosure. As illustrated, the method 900 begins at block 905, where one or more signals are received from any number of user devices 102. The signals may be received at a single signal processing device, or at multiple signal processing devices. At block 910, it is determined whether a predefined period of time has elapsed. For example, as discussed above, in an embodiment, user data is collected during a predefined window, and aggregated within that window. If the window has not yet closed, the method 900 returns to block 905 to continue receiving signals from user devices 102. If, however, the period of time has elapsed, the method 900 proceeds to block 915, where computing device 405 identifies user device(s) 102 in the data. For example, based on the unique identifier included in each transmitted signal, computing device 405 can identify which user devices 102 were detected during the time window (as well as the associated users).

The method 900 proceeds to block 920 for each identified user device 102. First, at block 925, computing device 405 determines whether all required points were received. In an embodiment, the manager or administrator can define which points are required, for example, using interface 505. For example, if the signal processing device(s) are associated with a queue, the administrator may require that each user device 102 be detected first by the entry signal processing device, and second by the exit signal processing device, without any intervening signal processing devices. Any other ordering (or if any of the required detections was not made) can trigger a "no" determination, at which point the method 900 proceeds to block 930, where the user data is ignored. The method 900 then returns to block 920 to perform similar operations for the next user device 102.

Of course, the required detections can be configured in other ways by the administrators, and may require additional signal processing device detections (such as at a midpoint or merge location). In some configurations, the administrator might not care if other signal processing devices detect the user device 102. Additionally, if the user device 102 was detected by one or more first signal processing devices but has not been detected by the exit signal processing device, it can be determined that the user has not exited the queue yet, and no spatiotemporal measure for the user device 102 can be generated. Similarly, in some embodiments, there might be multiple entrance signal processing devices, any one of which are sufficient to satisfy block 925.

If, at block 925, it is determined that the user device 102 data is valid (e.g., all required detections are present, and no disallowed detections are present), the method 900 proceeds to block 935, where the elapsed time is calculated based on the detected signals and the configuration of the signal processing device(s) or location/queue. At block 940, computing device 405 determines whether additional user devices 102 were detected that have not yet been processed. If so, the method 900 returns to block 920, where the data from each respective user device 102 is processed in the same way.

If, at block 940, it is determined that no more user devices remain, the method 900 proceeds to block 945, where the average time is calculated. Of course, as discussed above, other operations may be used to generate the estimated spatiotemporal measure, such as determining the mean, median, mode, maximum, minimum, and the like. The method 900 then returns to block 905, to begin receiving signals anew for the next window of time. The generated estimated spatiotemporal measure can be used in a variety of ways, as discussed above. For example, the spatiotemporal measure can be used to determine staffing needs at various times. Similarly, the measure can be posted to various signs, websites, and applications to allow users to view the current or historic spatiotemporal measures. Furthermore, in some embodiments, the estimated spatiotemporal measures can be used to determine any changes that may be warranted for a particular attraction or location.

Figure 10:
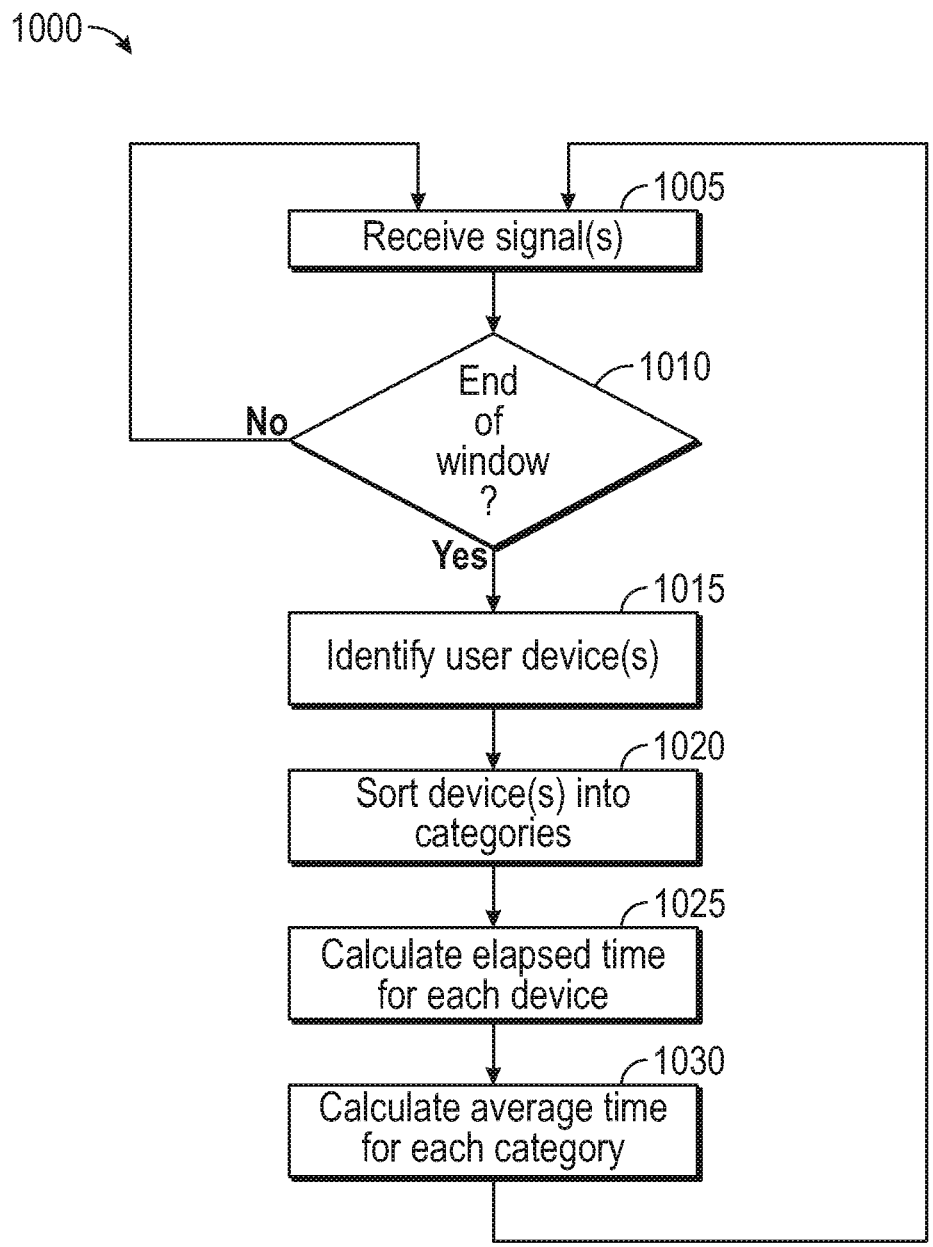
FIG. 10 illustrates a flowchart for a method of processing spatiotemporal data, according to one embodiment to the present disclosure.

FIG. 10 illustrates a flowchart for a method 1000 of processing spatiotemporal data, according to one embodiment to the present disclosure. As illustrated, the method 1000 begins at block 1005, where one or more signals are received from any number of user devices 102. The signals may be received at a single signal processing device, or at multiple signal processing devices. At block 1010, it is determined whether a predefined period of time has elapsed. For example, as discussed above, in an embodiment, user data is collected during a predefined window, and aggregated within that window. If the window has not yet closed, the method 1000 returns to block 1005 to continue receiving signals from user devices 102. If, however, the period of time has elapsed, the method 1000 proceeds to block 1015, where computing device 405 identifies user device(s) 102 in the data. For example, based on the unique identifier included in each transmitted signal, computing device 405 can identify which user devices 102 were detected during the time window (as well as the associated users).

At block 1020, data from the user devices 102 are sorted into predefined categories. In an embodiment, the user devices 102 are sorted based on one or more characteristics of the user associated with the user device 102. For example, the data may be sorted based on the age of each associated user, or any other characteristic such as the status of the user or the type of user. In some embodiments, the data may be sorted based on other factors, such as the device(s) that the user device 102 was identified by. For example, if multiple entrances exist for the queue or area, the user devices 102 may be sorted based on which entrance they used (as determined by which signal processing device first detected them). In various embodiments, the user devices 102 can be sorted in any number of ways.

Once the user devices 102 have been sorted, the method 1000 proceeds to block 1025, where the elapsed time is calculated for each user device 102. As discussed above, this spatiotemporal measure may reflect a wait time, dwell time, transit time, and the like. Further, although not illustrated, the method 1000 may include one or more validation operations, as discussed above. Finally, the method 1000 proceeds to block 1030, where the average time for each category is calculated. Other operations may also be used to generate the estimated spatiotemporal measure, such as determining the mean, median, mode, maximum, minimum, and the like. Finally, the method 1000 returns to block 1005 to restart for the new window.

Figure 11:
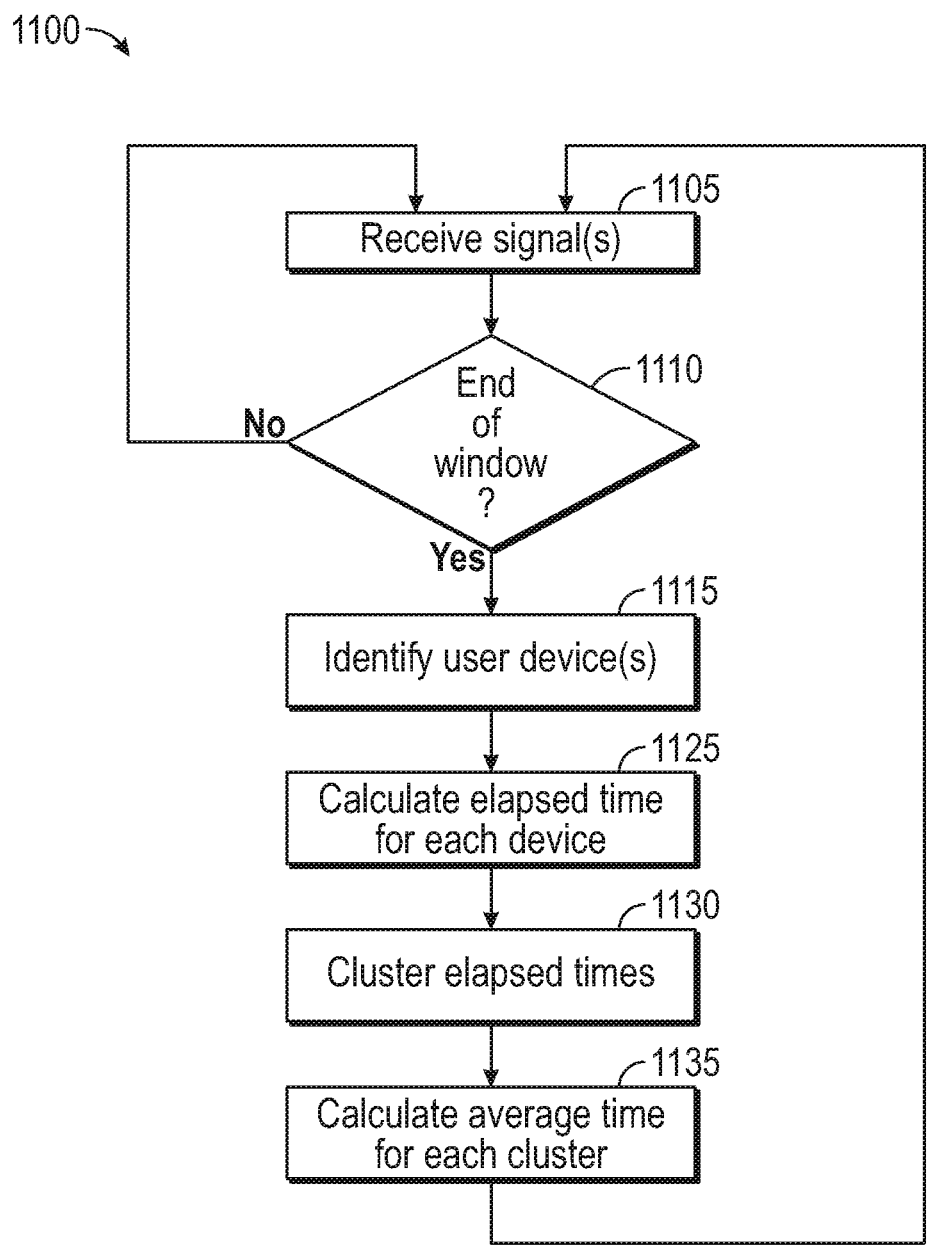
FIG. 11 illustrates a flowchart for a method of processing spatiotemporal data, according to one embodiment to the present disclosure.

FIG. 11 illustrates a flowchart for a method 1100 of processing spatiotemporal data, according to one embodiment to the present disclosure. As illustrated, the method 1100 begins at block 1105, where one or more signals are received from any number of user devices 102. The signals may be received at a single signal processing device, or at multiple signal processing devices. At block 1110, it is determined whether a predefined period of time has elapsed. For example, as discussed above, in an embodiment, user data is collected during a predefined window, and aggregated within that window. If the window has not yet closed, the method 1100 returns to block 1105 to continue receiving signals from user devices 102. If, however, the period of time has elapsed, the method 1100 proceeds to block 1115, where computing device 405 identifies user device(s) 102 in the data. For example, based on the unique identifier included in each transmitted signal, computing device 405 can identify which user devices 102 were detected during the time window (as well as the associated users).

After identifying the user devices 102, the method 1100 proceeds to block 1125, where the spatiotemporal measure (e.g., elapsed time) is calculated for each user device 102, as discussed above. The method 1100 then continues to block 1130, where the calculated times are clustered. For example, one or more clustering algorithms, such as k-means clustering, can be used to determine one or more clusters of times. Similarly, in some embodiments, elapsed times are assigned to a cluster because they fall further than a predefined distance away from the mean, such as one standard deviation. Finally, the method 1100 proceeds to block 1135, where average times are calculated for each cluster. Other operations may also be used to generate the estimated spatiotemporal measure, such as determining the mean, median, mode, maximum, minimum, and the like.

Advantageously, clustering the elapsed times allows identification of users who may have skipped all or portions of the line, or waited and allowed others to pass them. For example, a VIP user may join the queue midway through, rather than waiting from the beginning. Additionally, a nervous user may wait and allow others to pass before proceeding. In both instances, the determined average wait time should not include these outliers, because they are not representative of the typical user's experience.

Figure 12:
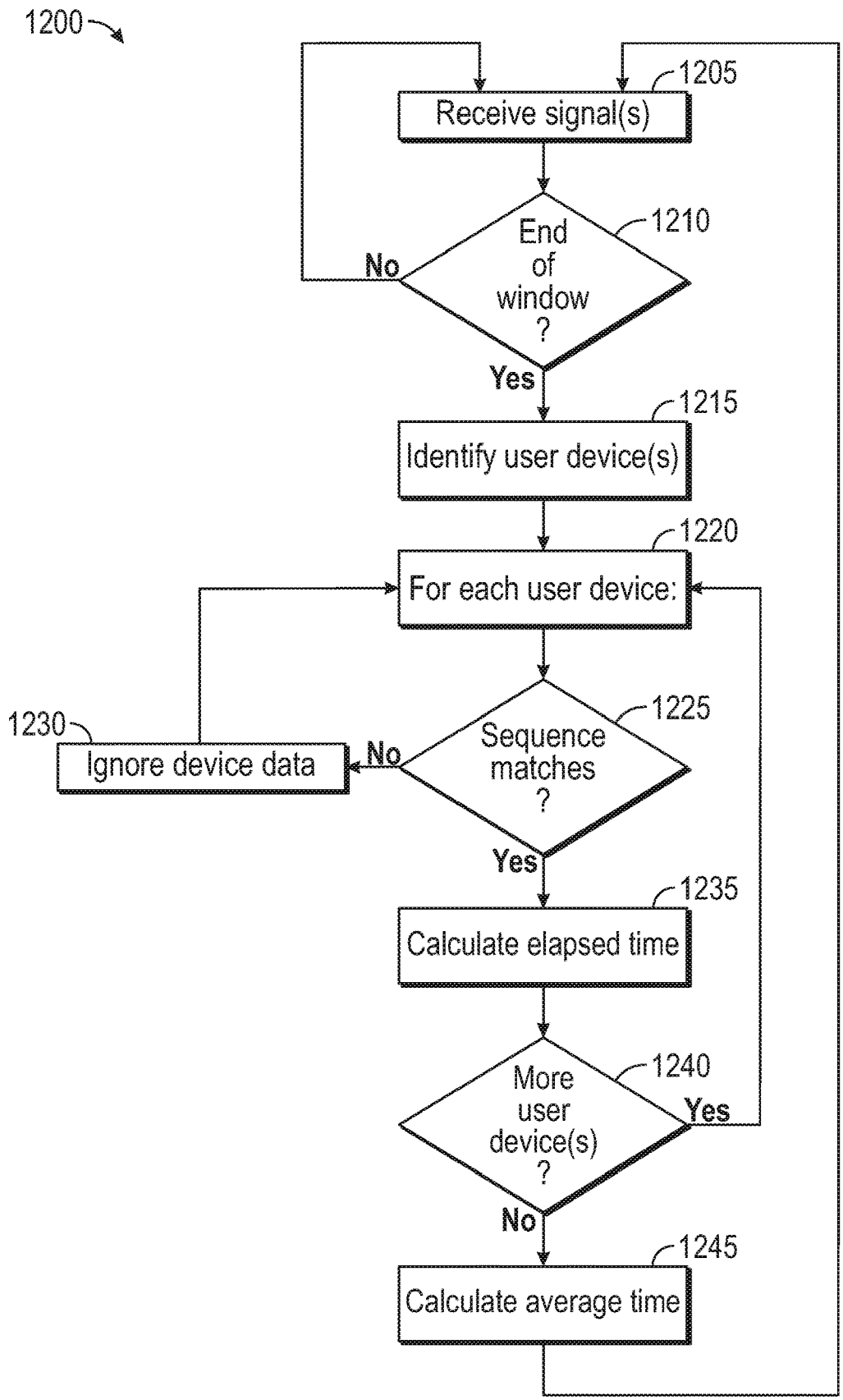
FIG. 12 illustrates a flowchart for a method of processing spatiotemporal data, according to one embodiment to the present disclosure.

FIG. 12 illustrates a flowchart for a method 1200 of processing spatiotemporal data, according to one embodiment to the present disclosure. As illustrated, the method 1200 begins at block 1205, where one or more signals are received from any number of user devices 102. The signals may be received at a single signal processing device, or at multiple signal processing devices. At block 1210, it is determined whether a predefined period of time has elapsed. For example, as discussed above, in an embodiment, user data is collected during a predefined window, and aggregated within that window. If the window has not yet closed, the method 1200 returns to block 1205 to continue receiving signals from user devices 102. If, however, the period of time has elapsed, the method 1200 proceeds to block 1215, where computing device 405 identifies user device(s) 102 in the data. For example, based on the unique identifier included in each transmitted signal, computing device 405 can identify which user devices 102 were detected during the time window (as well as the associated users).

The method 1200 proceeds to block 1220 for each identified user device 102. First, at block 1225, computing device 405 determines whether the sequences match at each signal processing device. That is, the one or more user devices 102 that were detected before and/or after each respective user device 102 is determined for each relevant signal processing device, and computing device 405 determines whether those sequences match, or whether the user devices 10c shifted out of sequence along the way. For example, if at the entry signal processing device, three user devices A, B, and C are detected in that order, it is determined whether they are still in order A, B, C at the exit signal processing device, as well as at one or more midpoints signal processing devices, if available.

In an embodiment, determining the sequence of user devices 102 at each signal processing device may involve different processing than determining the timestamp used for calculating the respective spatiotemporal measure. For example, although the "first" signal may be used to trigger the "entry" event, the "maximum" signal, "last" signal, or a combination of signals might be used to determine the sequence of user devices 102. In some embodiments, the user device 102 is classified as out-of-sequence if the sequence violates predefined criteria. For example, if the sequence is off by a small amount of time (e.g., user device "C" was behind the user device "B" at the start, but jumped ahead of the user device "B" at the end by a few seconds or less than a second), the sequence might be classified as valid in an embodiment.

Similarly, in some embodiments, if the number of user devices 102 that are out-of-sequence with respect to the respective user device 102 is below a predefined threshold, the computing device 405 may determine that the data is valid despite the mismatch. For example, if two, three, four, or some other predefined number of user devices 102 have swapped places, the computing device 405 may classify the pattern as substantially sequential, and therefore valid.

In some embodiments, the sequence at each relevant signal processing device may be considered when determining whether the user data is valid. That is, if two signal processing devices are used for a given area, the data from those signal processing devices may be compared. If a third signal processing device is used, such as at a merge point, the sequence at this midpoint signal processing device may also be considered. In some embodiments, if the sequence is incorrect at any signal processing device, the data is considered invalid. In other embodiments, however, the sequence at any of the intervening midpoint signal processing devices may not be relevant, and the sequence at the beginning and end signal processing devices are used.

If, at block 1225 it is determined that the sequence is invalid (e.g., because the mismatches exceed predefined criteria), the method 1200 proceeds to block 1230, where the data received from the user device 102 is ignored. That is, the respective data is not considered when generating the estimated spatiotemporal measures. The method 1200 then proceeds to block 1220 to begin processing the next user device 102 in the same way. If, however, it is determined that the sequence is valid (e.g., because it matches or any mismatch is within the predefined criteria), the method 1200 proceeds to block 1235, where the elapsed time is calculated for the respective user device 102.

At block 1240, computing device 405 determines whether additional user devices 102 were detected that have not yet been processed. If so, the method 1200 returns to block 1220, where the data from each respective user device 102 is processed in the same way. If, at block 1240, it is determined that no more user devices remain, the method 1200 proceeds to block 1245, where the average time is calculated. Of course, as discussed above, other operations may be used to generate the estimated spatiotemporal measure, such as determining the mean, median, mode, maximum, minimum, and the like. The method 1200 then returns to block 1205, to begin receiving signals anew for the next window of time.

Figure 13:
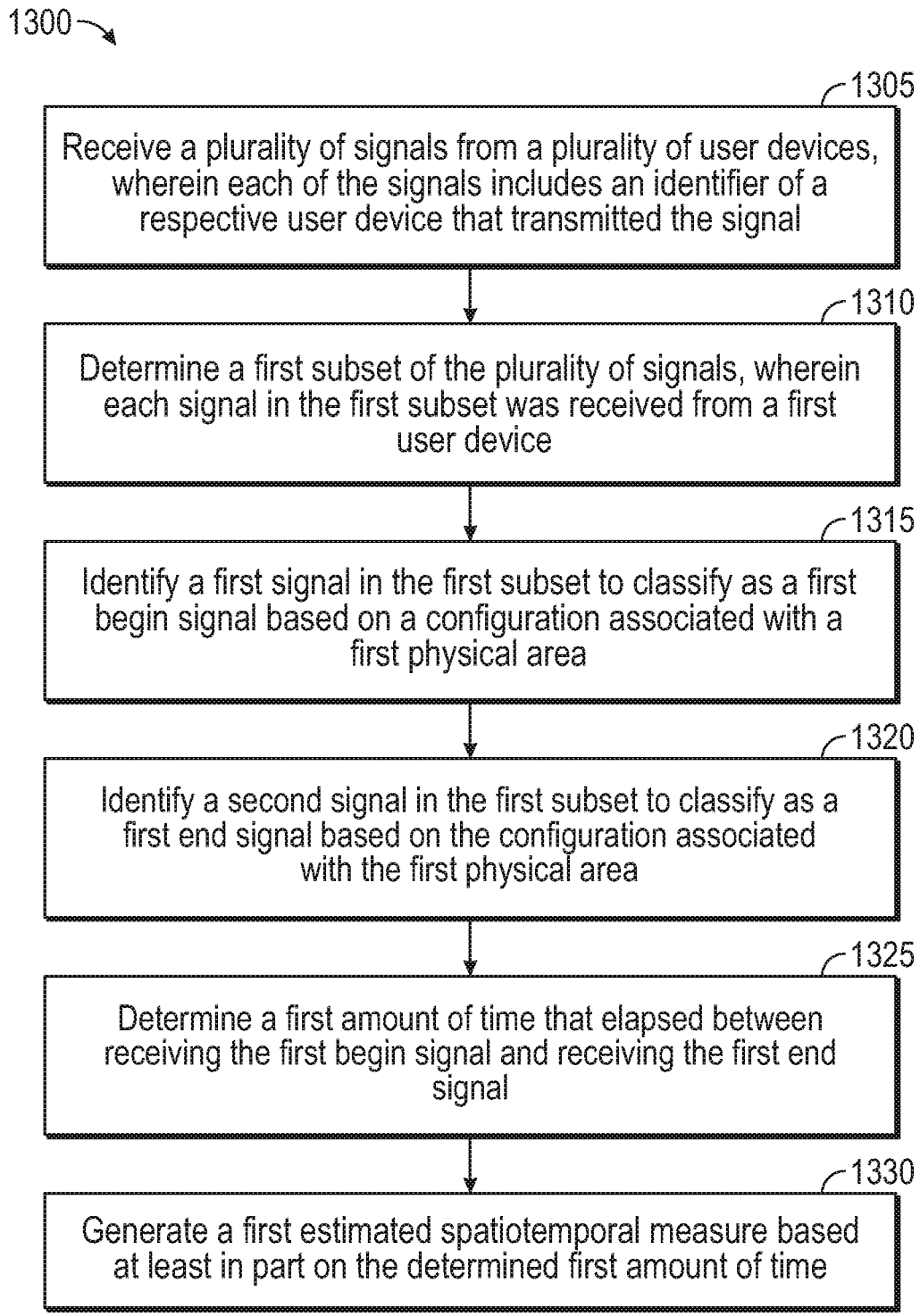
FIG. 13 is a flowchart illustrating a method of processing spatiotemporal data, according to one embodiment to the present disclosure.

FIG. 13 is a flowchart illustrating a method 1300 of processing spatiotemporal data, according to one embodiment of the present disclosure. The method 1300 begins at block 1305, where a plurality of signals are received from a plurality of user devices, wherein each of the signals includes an identifier of a respective user device that transmitted the signal. For example, as discussed above, the signals may be received by a signal processing device 105 or at computing device 405. The method 1300 proceeds to block 1310, where a first subset of the plurality of signals is determined, wherein each signal in the first subset was received from a first user device. At block 1315, a first signal in the first subset is identified, for example by computing device 405, to classify as a first begin signal based on a configuration associated with a first physical area. Additionally, at block 1320, a second signal in the first subset is identified to classify as a first end signal based on the configuration associated with the first physical area. The method 1300 continues to block 1325, where computing device 405 determines a first amount of time that elapsed between receiving the first begin signal and receiving the first end signal. Finally, the method 1300 terminate at block 1330, where computing device 405 generates a first estimated spatiotemporal measure based at least in part on the determined first amount of time.

Embodiments disclosed herein may be used to generate a large variety of spatiotemporal measures. For example, the wait time in one or more queues or portions thereof can be determined. Similarly, the amount of time spent in transit between two locations (whether in a vehicle or by foot) can be determined. In addition, embodiments disclosed herein enable the generation of spatiotemporal measures related to dwell time, such as the length of time users spend in a given region or land, or within a defined area, or at a specified location such as a chair, table, bench, and the like. Of course, other implementations will be clear to one of skill in the art.

In embodiments, the determined spatiotemporal measures can be used for a wide variety of purposes. For example, based on real-time data, it can be determined that additional lines should be opened or additional shuttles should be provided, because the wait time is growing or the length of the line has exceeded a predefined point. Similarly, if the wait times or the line are short, it can be determined that one or more vehicles can be removed from the rotation or one or more queues can be closed, in order to better conserve resources or allocate resources to another area. Additionally, based on historical data, the optimal resources for each area at each point of time can be determined. Further, any other adjustments can be made based on the determined spatiotemporal data, such as the length of a ride or show, the themes or concepts included (for example, in order to better reach different age groups) and the like.

In the preceding, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for determining whether a particular user is participating in a queue, the method comprising:
    identifying a first user device associated with a first user, wherein the first user device is configured to output an identifier of the first user device;
    receiving, by one or more signal processing devices, a first set of radio frequency (RF) signals output by the first user device;
    determining a first location of the first user device, based on the first set of RF signals;
    identifying a first begin time for the first user device based on a first configuration and the first set of RF signals;
    identifying a first end time for the first user device based on the first configuration and the first set of RF signals;
    determining a first amount of time that elapsed between the first begin time and the first end time;
    comparing the first amount of time to a mean or median amount of time that elapsed while one or more users participated in the queue in order to determine whether the first user participated in the queue; and
    determining that the first user did not participate in the queue and that the first amount of time is not representative of a length of the queue based on how far the first amount of time is from the second amount of time.

2. The method of claim 1, the method further comprising:
    receiving, by one or more signal processing devices, a plurality of RF signals output by a plurality of user devices;
    for each respective user device of the plurality of user devices:
        selecting a respective subset of RF signals from the plurality of RF signals, wherein each of the respective subset of RF signals were output by the respective user device;
        identifying a respective begin time based on the first configuration and the respective set of RF signals output by the respective user device;
        identifying a respective end time based on the first configuration and the respective set of RF signals output by the respective user device; and
        determining, based on the respective begin time and the respective end time, whether the respective user device is representative of an average user participating in the queue; and
    generating an aggregated spatiotemporal measure based on a subset of the plurality if user devices that are determined to be representative of average users participating in the queue.

3. The method of claim 1, the method further comprising:
    receiving, by one or more signal processing devices, a second set of RF signals output by a second user device associated with a second user;

determining a first dwell time during which the first user device was detected by a first signal processing device configured to detect user devices entering the queue, based on the first configuration and the first set of RF signals;

determining a second dwell time during which the second user device was detected by the first signal processing device, based on the first configuration and the second set of RF signals; and upon determining that a difference between the second dwell time and the first dwell time exceeds a predefined threshold, determining that the second user device is not representative of an average user participating in the queue.

4. The method of claim 1, the method further comprising:

receiving, by one or more signal processing devices, a second set of RF signals output by a second user device associated with a second user; and determining that the second user device is not representative of an average user participating in the queue, based on determining that the second user device was detected by a third signal processing device after being detected by a first signal processing device configured to detect users entering the queue and before being detected by a second signal processing device configured to detect user devices exiting the queue.

5. The method of claim 1, the method further comprising:

receiving, by one or more signal processing devices, a second set of RF signals output by a second user device associated with a second user;

identifying a second begin time for the second user device based on the first configuration and the second set of RF signals;

identifying a second end time for the second user device based on the first configuration and the second set of RF signals;

determining a second amount of time that elapsed between the second begin time and the second end time; and determining that the second user device is not representative of an average user participating in the queue, based on determining that a difference between the first amount of time and the second amount of time exceeds a predefined threshold.

6. The method of claim 1, the method further comprising:

receiving, by one or more signal processing devices, a second set of RF signals output by a second user device associated with a second user;

identifying a first RF signal in the second set of RF signals to use as a second begin time based on the first configuration;

identifying a second RF signal in the second set of RF signals to use as a second end time based on the first configuration; and determining that the second user device is not representative of an average user participating in the queue, based on determining that a sequence of RF signals received before or after the first RF signal differs from a sequence of RF signals received before or after the second RF signal.

7. The method of claim 1, the method further comprising generating a first spatiotemporal measure by subtracting a predefined amount of time from the determined first amount of time, wherein the predefined amount of time corresponds to a time needed to physically move from a location of a first signal processing device that received an RF signal corresponding to the first begin time to a second signal processing device that received an RF signal corresponding to the first end time.

8. The method of claim 1, wherein the first configuration defines which RF signal of the first set of RF signals to use when defining the first begin time as one of:

(i) a first received RF signal of the first set of RF signals, (ii) a last received RF signal of the first set of RF signals, or (iii) a strongest RF signal of the first set of RF signals.

9. The method of claim 1, wherein at least one of the first set of RF signals is received by a signal processing device configurable to set a distance at which RF signals from user devices are detected.

10. A system comprising:

a plurality of signal processing devices; and a computing device comprising a processor and a computer memory storing a program, which, when executed on the processor, performs an operation for determining whether a particular user is participating in a queue, the operation comprising:

identifying a first user device associated with a first user, wherein the first user device is configured to output an identifier of the first user device;

receiving, by one or more signal processing devices, a first set of radio frequency (RF) signals output by the first user device;

determining a first location of the first user device, based on the first set of RF signals;

identifying a first begin time for the first user device based on a first configuration and the first set of RF signals;

identifying a first end time for the first user device based on the first configuration and the first set of RF signals;

determining a first amount of time that elapsed between the first begin time and the first end time;

comparing the first amount of time to a mean or median amount of time that elapsed while one or more users participated in the queue in order to determine whether the first user participated in the queue; and determining that the first user did not participate in the queue and that the first amount of time is not representative of a length of the queue based on how far the first amount of time is from the second amount of time.

11. The system of claim 10, the operation further comprising:

receiving, by one or more signal processing devices, a plurality of RF signals output by a plurality of user devices;

for each respective user device of the plurality of user devices:

selecting a respective subset of RF signals from the plurality of RF signals, wherein each of the respective subset of RF signals were output by the respective user device;

identifying a respective begin time based on the first configuration and the respective set of RF signals output by the respective user device;

identifying a respective end time based on the first configuration and the respective set of RF signals output by the respective user device; and determining, based on the respective begin time and the respective end time, whether the respective user device is representative of an average user participating in the queue; and generating an aggregated spatiotemporal measure based on a subset of the plurality if user devices that are determined to be representative of average users participating in the queue.

12. The system of claim 10, the operation further comprising:
   receiving, by one or more signal processing devices, a second set of RF signals output by a second user device associated with a second user;
   determining a first dwell time during which the first user device was detected by a first signal processing device configured to detect user devices entering the queue, based on the first configuration and the first set of RF signals;
   determining a second dwell time during which the second user device was detected by the first signal processing device, based on the first configuration and the second set of RF signals; and
   upon determining that a difference between the second dwell time and the first dwell time exceeds a predefined threshold, determining that the second user device is not representative of an average user participating in the queue.

13. The system of claim 10, the operation further comprising:
   receiving, by one or more signal processing devices, a second set of RF signals output by a second user device associated with a second user; and
   determining that the second user device is not representative of an average user participating in the queue, based on determining that the second user device was detected by a third signal processing device after being detected by a first signal processing device configured to detect user devices entering the queue and before being detected by a second signal processing device configured to detect user devices exiting the queue.

14. The system of claim 10, the operation further comprising:
   receiving, by one or more signal processing devices, a second set of RF signals output by a second user device associated with a second user;
   identifying a second begin time for the second user device based on the first configuration and the second set of RF signals;
   identifying a second end time for the second user device based on the first configuration and the second set of RF signals;
   determining a second amount of time that elapsed between the second begin time and the second end time; and
   determining that the second user device is not representative of an average user participating in the queue, based on determining that a difference between the first amount of time and the second amount of time exceeds a predefined threshold.

15. The system of claim 10, the operation further comprising:
   receiving, by one or more signal processing devices, a second set of RF signals output by a second user device associated with a second user;
   identifying a first RF signal in the second set of RF signals to use as a second begin time based on the first configuration;
   identifying a second RF signal in the second set of RF signals to use as a second end time based on the first configuration; and
   determining that the second user device is not representative of an average user participating in the queue, based on determining that a sequence of RF signals received before or after the first RF signal differs from a sequence of RF signals received before or after the second RF signal.

16. The system of claim 10, the operation further comprising generating a first estimated spatiotemporal measure by subtracting a predefined amount of time from the determined first amount of time, wherein the predefined amount of time corresponds to a time needed to physically move from a location of a first signal processing device that received an RF signal corresponding to the first begin time to a second signal processing device that received an RF signal corresponding to the first end time.

17. The system of claim 10, wherein the first configuration defines which RF signal of the first set of RF signals to use when defining the first begin time as one of:
   (i) a first received RF signal of the first set of RF signals,
   (ii) a last received RF signal of the first set of RF signals, or
   (iii) a strongest RF signal of the first set of RF signals.

18. A non-transitory computer-readable storage medium having computer-readable program code embodied therewith, the computer-readable program code executable by one or more computer processors to perform an operation for determining whether a particular user is participating in a queue, the operation comprising:
   identifying a first user device associated with a first user, wherein the first user device is configured to output an identifier of the first user device;
   receiving, by one or more signal processing devices, a first set of radio frequency (RF) signals output by the first user device;
   determining a first location of the first user device, based on the first set of RF signals;
   identifying a first begin time for the first user device based on a first configuration and the first set of RF signals;
   identifying a first end time for the first user device based on the first configuration and the first set of RF signals;
   determining a first amount of time that elapsed between the first begin time and the first end time;
   comparing the first amount of time to a mean or median amount of time that elapsed while one or more users participated in the queue in order to determine whether the first user participated in the queue; and
   determining that the first user did not participate in the queue and that the first amount of time is not representative of a length of the queue based on how far the first amount of time is from the second amount of time.

19. The non-transitory computer-readable storage medium of claim 18, the operation further comprising:
   receiving, by one or more signal processing devices, a plurality of RF signals output by a plurality of user devices;
   for each respective user device of the plurality of user devices:
      selecting a respective subset of RF signals from the plurality of RF signals, wherein each of the respective subset of RF signals were output by the respective user device;
      identifying a respective begin time based on the first configuration and the respective set of RF signals output by the respective user device;
      identifying a respective end time based on the first configuration and the respective set of RF signals output by the respective user device; and determining, based on the respective begin time and the respective end time, whether the respective user device is representative of an average user participating in the queue; and generating an aggregated spatiotemporal measure based on a subset of the plurality if user devices that are determined to be representative of average users participating in the queue.

20. The non-transitory computer-readable storage medium of claim 18, the operation further comprising:

receiving, by one or more signal processing devices, a second set of RF signals output by a second user device associated with a second user;

determining a first dwell time during which the first user device was detected by a first signal processing device configured to detect user devices entering the queue, based on the first configuration and the first set of RF signals;

determining a second dwell time during which the second user device was detected by the first signal processing device, based on the first configuration and the second set of RF signals; and upon determining that a difference between the second dwell time and the first dwell time exceeds a predefined threshold, determining that the second user device is not representative of an average user participating in the queue.

\* \* \* \* \*

UNITED STATES PATENT AND TRADEMARK OFFICE
CERTIFICATE OF CORRECTION

PATENT NO. : 11,109,188 B2
APPLICATION NO. : 15/956668
DATED : August 31, 2021
INVENTOR(S) : John Robert Rankin, V et al.

Page 1 of 1

It is certified that error appears in the above-identified patent and that said Letters Patent is hereby corrected as shown below:

In the Claims

In Column 26, Line 61, in Claim 2, delete "if" and insert -- of --, therefor.

In Column 29, Line 2, in Claim 11, delete "if" and insert -- of --, therefor.

In Column 31, Line 6, in Claim 19, delete "if" and insert -- of --, therefor.

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*